US007972206B2

(12) United States Patent
Okada

(10) Patent No.: US 7,972,206 B2
(45) Date of Patent: Jul. 5, 2011

(54) GAMING MACHINE AND DISPLAY DEVICE THEREFOR

(75) Inventor: Kazuo Okada, Tokyo (JP)

(73) Assignee: WMS Gaming Inc., Waukegan, IL (US)

( * ) Notice: Subject to any disclaimer, the term of this patent is extended or adjusted under 35 U.S.C. 154(b) by 1230 days.

(21) Appl. No.: 10/715,598

(22) Filed: Nov. 19, 2003

(65) Prior Publication Data

US 2004/0152501 A1 Aug. 5, 2004
US 2008/0261674 A9 Oct. 23, 2008

(30) Foreign Application Priority Data

Nov. 20, 2002 (JP) ................................ 2002-337131

(51) Int. Cl.
*A63F 13/12* (2006.01)

(52) U.S. Cl. ................ 463/16; 463/20; 463/31; 463/34; 273/139; 273/317.1; 273/460; 273/461; 345/1.1; 345/11; 345/204; 345/213; 348/563; 348/607; 348/634

(58) Field of Classification Search .................... 463/33, 463/34, 35, 36, 16, 20, 22–23, 30–32; 273/108.1, 273/138.2, 139, 141 A, 142 R, 143 C, 142 B, 273/142 H, 317.1, 359, 460–461; 345/1.1, 345/11, 14, 204, 211–213; 348/553, 559–560, 348/563, 567–568, 607–624, 634–637, 704–706, 348/731–732; *A63F 13/12*
See application file for complete search history.

(56) References Cited

U.S. PATENT DOCUMENTS

| | | | | | |
|---|---|---|---|---|---|
| 4,238,793 | A | * | 12/1980 | Hochstrate | 345/102 |
| 4,306,768 | A | | 12/1981 | Egging | 350/174 |
| 4,315,276 | A | * | 2/1982 | Harada et al. | 386/2 |
| 4,371,870 | A | * | 2/1983 | Biferno | 345/4 |
| 4,454,670 | A | | 6/1984 | Bachmann et al. | 194/350 |
| 4,517,558 | A | | 5/1985 | Davids | 340/700 |
| 4,518,225 | A | * | 5/1985 | Fredrickson et al. | 349/68 |
| 4,520,401 | A | * | 5/1985 | Takahashi et al. | 386/37 |
| 4,551,753 | A | * | 11/1985 | Nishizawa et al. | 348/446 |
| 4,562,433 | A | * | 12/1985 | Biferno | 345/4 |
| 4,568,928 | A | * | 2/1986 | Biferno | 345/5 |

(Continued)

FOREIGN PATENT DOCUMENTS

AU 1999-043488 3/2000

(Continued)

OTHER PUBLICATIONS

Notice of Reasons for Rejection in counterpart Japanese Application No. 2003-054664 (Sep. 1, 2005).

(Continued)

*Primary Examiner* — Arthur O. Hall
(74) *Attorney, Agent, or Firm* — Nixon Peabody LLP

(57) ABSTRACT

A gaming machine capable of maintaining the interest of a player even when the gaming machine does not work normally. For, example, a slot machine (10) comprises a display device (30) for displaying an image, and an image state control unit for controlling the display device (30) to display an image relating to a game. The slot machine (10) may be characterized in that the image state control unit controls the display device into a predetermined state upon determination that an image signal relating to the image provided to the display device fails to satisfy a predetermined condition.

23 Claims, 18 Drawing Sheets

U.S. PATENT DOCUMENTS 4,691,365 A * 9/1987 Nagashima ................... 382/274
4,718,672 A 1/1988 Okada ........................... 273/143
4,756,414 A 7/1988 Mott ............................ 206/328
4,826,296 A 5/1989 Yoshimura .................... 350/338
4,860,090 A * 8/1989 Murata et al. ................. 348/604
4,975,692 A * 12/1990 Tateyama ...................... 345/102
4,976,429 A 12/1990 Nagel ............................... 273/1
4,984,082 A * 1/1991 Okamura ...................... 348/565
4,998,804 A 3/1991 Horiuchi ....................... 350/334
5,058,994 A * 10/1991 Mihara et al. ................... 345/97
5,115,228 A * 5/1992 Harris et al. ...................... 345/5
5,146,354 A 9/1992 Plesinger ........................ 359/49
5,152,529 A 10/1992 Okada ........................... 273/143
5,258,844 A 11/1993 Nakayama et al. ........... 358/209
5,283,560 A 2/1994 Bartlett ......................... 345/113
5,351,966 A 10/1994 Tohyama et al. ............. 273/311
5,372,745 A 12/1994 Yoshinaga .................... 252/299
5,375,043 A 12/1994 Tokunaga ....................... 362/31
5,393,061 A 2/1995 Manship et al. .......... 273/143 R
5,394,171 A * 2/1995 Rabii ........................... 345/213
5,412,404 A * 5/1995 Candy ........................... 345/211
5,469,221 A * 11/1995 Takeuchi ...................... 348/564
5,481,274 A * 1/1996 Aratani et al. .................. 345/98
5,500,654 A * 3/1996 Fujimoto ...................... 345/634
5,546,296 A 8/1996 Savignac et al. ................ 363/60
5,580,055 A 12/1996 Hagiwara ................. 273/143 R
5,636,101 A 6/1997 Bonsall et al. ................ 361/681
5,667,439 A 9/1997 Okada ............................ 463/20
5,673,128 A 9/1997 Ohta et al. ...................... 349/62
5,691,788 A 11/1997 Kim ................................ 349/96
5,695,188 A 12/1997 Ishibashi ................... 273/143 R
5,697,843 A 12/1997 Manship et al. ................ 463/20
5,712,690 A * 1/1998 Kim ............................. 348/570
5,722,891 A 3/1998 Inoue ............................. 463/20
5,725,210 A 3/1998 Yamaguchi et al. .......... 273/121
5,725,428 A 3/1998 Achmuller ...................... 463/20
5,745,199 A 4/1998 Suzuki et al. ................... 349/95
5,752,881 A 5/1998 Inoue ............................. 463/20
5,757,366 A * 5/1998 Suzuki .......................... 345/213
5,767,894 A * 6/1998 Fuller et al. ..................... 725/82
5,768,095 A 6/1998 Nakamura et al. ............ 361/681
5,800,265 A * 9/1998 Yamazaki et al. .............. 463/23
5,805,150 A * 9/1998 Nishino et al. ................ 345/213
5,810,665 A 9/1998 Takemoto et al. .............. 463/31
5,812,745 A * 9/1998 Kim et al. .................... 358/1.14
5,828,381 A * 10/1998 Penna ........................... 345/473
5,836,819 A 11/1998 Ugawa ............................ 463/30
5,844,534 A * 12/1998 Okumura et al. ............... 345/90
5,890,962 A 4/1999 Takemoto ....................... 463/20
5,892,505 A * 4/1999 Tropper ........................ 345/208
5,912,713 A * 6/1999 Tsunoda et al. .............. 348/540
5,914,757 A * 6/1999 Dean et al. .................... 348/584
5,920,256 A * 7/1999 Toffolo et al. ................ 340/461
5,934,672 A 8/1999 Sines et al. ................ 273/143 R
5,978,039 A * 11/1999 Usui et al. ..................... 348/553
5,980,384 A 11/1999 Barrie ............................. 463/16
6,027,115 A 2/2000 Griswold et al. ......... 273/143 R
6,036,188 A 3/2000 Gomez et al. ............. 273/118 R
6,038,188 A 3/2000 Akamatsu ..................... 365/226
6,056,642 A 5/2000 Bennett ........................... 463/20
6,086,066 A 7/2000 Takeuchi et al. .......... 273/143 R
6,089,977 A 7/2000 Bennett ........................... 463/20
6,095,921 A 8/2000 Walker et al. ................... 463/20
6,135,884 A 10/2000 Hedrick et al. ................. 463/20
6,135,885 A 10/2000 Lermusiaux .................... 463/20
6,141,067 A 10/2000 Ikka ................................ 349/65
6,151,169 A 11/2000 Kim .............................. 359/640
6,159,097 A 12/2000 Gura ............................... 463/20
6,164,645 A 12/2000 Weiss ......................... 273/138.2
6,181,301 B1 * 1/2001 Inoguchi et al. .................. 345/5
6,190,255 B1 2/2001 Thomas et al. ................. 463/20
6,193,606 B1 2/2001 Walker et al. ................... 463/20
6,213,875 B1 * 4/2001 Suzuki ............................ 463/20
6,215,481 B1 * 4/2001 Tanijiri et al. ................. 345/207
6,219,228 B1 4/2001 Sun ............................... 361/683
6,224,482 B1 5/2001 Bennett ........................... 463/20
6,232,951 B1 * 5/2001 Miyamoto .................... 345/698
6,251,013 B1 6/2001 Bennett ........................... 463/13
6,261,177 B1 7/2001 Bennett ........................... 463/16
6,270,411 B1 8/2001 Gura et al. ...................... 463/20
6,290,600 B1 9/2001 Glasson .......................... 463/20
6,315,663 B1 11/2001 Sakamoto ....................... 463/20
6,315,666 B1 * 11/2001 Mastera et al. ................. 463/31
6,317,128 B1 11/2001 Harrison et al. .............. 345/629
6,339,412 B1 * 1/2002 Lee ................................ 345/14
6,339,418 B1 1/2002 Kitagawa ...................... 345/102
6,364,766 B1 4/2002 Anderson et al. ............... 463/16
6,368,216 B1 4/2002 Hedrick et al. ................. 463/20
6,375,568 B1 4/2002 Roffman et al. ................ 463/26
6,377,275 B1 4/2002 Kim
6,377,339 B1 4/2002 Westerman ..................... 355/75
6,392,642 B1 * 5/2002 Wu .............................. 345/213
6,406,159 B1 6/2002 Yamamoto ...................... 362/31
6,419,579 B1 7/2002 Bennett ........................... 463/20
6,439,999 B1 * 8/2002 Matsuzawa ..................... 463/43
6,475,084 B2 * 11/2002 Tanibuchi et al. ................ 463/3
6,475,087 B1 11/2002 Cole .............................. 463/20
6,517,432 B1 2/2003 Jaffe .............................. 463/16
6,517,433 B2 * 2/2003 Loose et al. .................... 463/20
6,587,083 B1 * 7/2003 Basturk ............................ 345/4
6,599,195 B1 * 7/2003 Araki et al. ..................... 463/43
6,600,527 B1 * 7/2003 Basturk et al. .................. 349/74
6,621,509 B1 * 9/2003 Eiref et al. .................... 715/836
6,623,006 B2 9/2003 Weiss ........................... 273/138
6,638,165 B2 10/2003 Uchiyama et al. .............. 463/20
6,642,975 B2 11/2003 Chino et al. .................... 349/65
6,667,693 B1 * 12/2003 Kim et al. .................. 340/815.4
6,680,742 B2 * 1/2004 Mamiya et al. ............... 345/660
6,695,696 B1 2/2004 Kaminkow ..................... 463/16
6,705,611 B2 3/2004 Kato ......................... 273/143 R
6,707,437 B1 * 3/2004 Kuno et al. .................. 345/74.1
6,720,021 B2 4/2004 Wong et al. ................... 426/633
6,720,961 B2 4/2004 Tracy ........................... 345/419
6,734,927 B2 5/2004 Sato ............................... 349/58
6,790,140 B1 9/2004 Niwa ............................. 463/20
6,802,575 B1 10/2004 Lee ................................ 312/72
6,809,716 B1 * 10/2004 Kim ................................ 345/98
6,811,273 B2 11/2004 Satoh et al. ..................... 362/27
6,817,946 B2 11/2004 Motegi et al. ................... 463/31
6,820,875 B1 11/2004 Hedrick et al. ............ 273/138.1
6,824,466 B1 11/2004 Hirota ............................ 463/20
6,837,790 B1 1/2005 Kaminkow ..................... 463/31
6,853,410 B2 2/2005 Matsuda et al. ................ 349/67
6,864,884 B2 * 3/2005 Nakano et al. ................ 345/213
6,893,345 B2 5/2005 Motegi et al. ................... 463/31
6,923,721 B2 8/2005 Luciano et al. ................. 463/24
6,937,298 B2 8/2005 Okada ............................ 349/58
6,942,571 B1 9/2005 McAllister et al. ............. 463/20
6,947,034 B2 * 9/2005 Kwon ........................... 345/204
6,950,144 B2 * 9/2005 Chae ............................ 348/513
6,954,238 B2 10/2005 Liu et al. ........................ 349/65
6,976,915 B2 12/2005 Baker et al. ...................... 463/1
7,023,495 B2 * 4/2006 Miki et al. .................... 348/584
7,030,870 B2 * 4/2006 Medcalf ....................... 345/213
7,064,740 B2 * 6/2006 Daly ............................ 345/102
7,092,048 B2 8/2006 Jeong ............................. 349/58
7,097,560 B2 8/2006 Okada ............................ 463/20
7,115,033 B1 10/2006 Timperley ....................... 463/20
7,140,963 B2 11/2006 Kojima .......................... 463/20
7,159,865 B2 1/2007 Okada .......................... 273/143
7,160,187 B2 1/2007 Loose et al. .................... 463/20
7,166,029 B2 1/2007 Enzminger ..................... 463/20
7,169,048 B2 1/2007 Nozaki et al. .................. 463/30
7,204,753 B2 4/2007 Ozaki et al. ..................... 463/16
7,207,883 B2 4/2007 Nozaki et al. .................. 463/24
7,219,893 B2 5/2007 Tanimura et al. ............. 273/143
7,220,181 B2 5/2007 Okada ............................ 463/32
7,234,697 B2 6/2007 Okada .......................... 273/143
7,255,643 B2 8/2007 Ozaki et al. ..................... 463/20
7,281,980 B2 10/2007 Okada ............................ 463/20
7,307,643 B2 * 12/2007 Moroo et al. ................. 345/667
7,322,884 B2 1/2008 Emori et al. .................... 463/16
7,329,181 B2 2/2008 Hoshino et al. ................. 463/20
7,355,660 B2 4/2008 Ikeda ............................. 349/60
7,390,259 B2 6/2008 Okada ............................ 463/20
7,404,766 B2 7/2008 Adachi et al. ................... 463/31
7,458,890 B2 12/2008 Loose et al. .................... 463/16

| | | | | |
|---|---|---|---|---|
| 7,465,228 | B2 | 12/2008 | Okada | 463/20 |
| 7,479,061 | B2 | 1/2009 | Okada | 463/20 |
| 7,479,066 | B2 | 1/2009 | Emori | 463/46 |
| 7,485,039 | B2 | 2/2009 | Okada | 463/20 |
| 7,510,475 | B2 | 3/2009 | Loose et al. | 463/31 |
| 7,510,476 | B2 | 3/2009 | Kobayashi | 463/31 |
| 7,520,812 | B2 | 4/2009 | Okada | 463/31 |
| 7,525,540 | B2 * | 4/2009 | Song | 345/204 |
| 7,585,220 | B2 | 9/2009 | Loose et al. | 463/20 |
| 7,618,317 | B2 * | 11/2009 | Jackson | 463/24 |
| 7,677,572 | B2 * | 3/2010 | Ozaki et al. | 273/274 |
| 7,695,364 | B2 | 4/2010 | Okada | 463/20 |
| 7,730,413 | B1 | 6/2010 | Engel et al. | 715/764 |
| 7,841,944 | B2 * | 11/2010 | Wells | 463/37 |
| 2001/0000636 | A1 | 5/2001 | Weiss | 273/138.2 |
| 2001/0013681 | A1 | 8/2001 | Bruzzese et al. | 273/143 |
| 2001/0019479 | A1 | 9/2001 | Nakabayashi et al. | 362/31 |
| 2001/0031658 | A1 * | 10/2001 | Ozaki et al. | 463/16 |
| 2001/0050736 | A1 | 12/2001 | Lee et al. | 349/65 |
| 2001/0052955 | A1 | 12/2001 | Nagatani | 349/65 |
| 2002/0063816 | A1 | 5/2002 | Nakamura et al. | 349/65 |
| 2002/0142830 | A1 | 10/2002 | Adams | 463/20 |
| 2002/0175466 | A1 | 11/2002 | Loose et al. | 273/143 |
| 2003/0016313 | A1 | 1/2003 | Jeong | 349/58 |
| 2003/0060269 | A1 | 3/2003 | Paulsen et al. | 463/20 |
| 2003/0087689 | A1 | 5/2003 | Adams | 463/20 |
| 2003/0087690 | A1 | 5/2003 | Loose et al. | 463/20 |
| 2003/0130028 | A1 | 7/2003 | Aida et al. | 463/20 |
| 2003/0157980 | A1 * | 8/2003 | Loose et al. | 463/20 |
| 2003/0162579 | A1 | 8/2003 | Gauselmann | 463/16 |
| 2003/0166417 | A1 | 9/2003 | Moriyama et al. | 463/46 |
| 2003/0184690 | A1 | 10/2003 | Ogiwara et al. | 349/61 |
| 2003/0214471 | A1 | 11/2003 | Topelberg | 345/87 |
| 2003/0234489 | A1 | 12/2003 | Okada | 273/236 |
| 2003/0236118 | A1 | 12/2003 | Okada | 463/20 |
| 2004/0014520 | A1 | 1/2004 | Okada | 463/20 |
| 2004/0021705 | A1 | 2/2004 | Baker et al. | 347/2 |
| 2004/0029636 | A1 | 2/2004 | Wells | 463/32 |
| 2004/0048646 | A1 | 3/2004 | Visocnik | 463/16 |
| 2004/0052078 | A1 | 3/2004 | Hosaka | 362/302 |
| 2004/0062025 | A1 | 4/2004 | Satoh et al. | 362/27 |
| 2004/0063490 | A1 | 4/2004 | Okada | 463/20 |
| 2004/0116178 | A1 | 6/2004 | Okada | 463/20 |
| 2004/0125110 | A1 * | 7/2004 | Kohda et al. | 345/501 |
| 2004/0147303 | A1 | 7/2004 | Imura et al. | 463/16 |
| 2004/0150162 | A1 | 8/2004 | Okada | 273/292 |
| 2004/0152501 | A1 | 8/2004 | Okada | 463/16 |
| 2004/0152502 | A1 | 8/2004 | Okada | 463/16 |
| 2004/0166925 | A1 | 8/2004 | Emori et al. | 463/20 |
| 2004/0166926 | A1 | 8/2004 | Adachi et al. | 463/20 |
| 2004/0171418 | A1 | 9/2004 | Okada | 463/20 |
| 2004/0192441 | A1 | 9/2004 | Nonaka | 463/31 |
| 2004/0198485 | A1 | 10/2004 | Loose et al. | 463/20 |
| 2004/0207154 | A1 | 10/2004 | Okada | 273/138.1 |
| 2004/0209666 | A1 | 10/2004 | Tashiro et al. | 463/20 |
| 2004/0209667 | A1 | 10/2004 | Emori et al. | 463/20 |
| 2004/0209668 | A1 | 10/2004 | Okada | 463/20 |
| 2004/0209670 | A1 | 10/2004 | Adachi et al. | 463/20 |
| 2004/0209671 | A1 | 10/2004 | Okada | 463/20 |
| 2004/0209672 | A1 | 10/2004 | Okada | 463/20 |
| 2004/0209676 | A1 | 10/2004 | Onishi et al. | 463/29 |
| 2004/0209678 | A1 | 10/2004 | Okada | 463/30 |
| 2004/0209679 | A1 | 10/2004 | Nonaka | 463/30 |
| 2004/0209681 | A1 | 10/2004 | Emori et al. | 463/31 |
| 2004/0209682 | A1 | 10/2004 | Okada | 463/31 |
| 2004/0209683 | A1 | 10/2004 | Okada | 463/31 |
| 2004/0214635 | A1 | 10/2004 | Okada | 463/30 |
| 2004/0214636 | A1 | 10/2004 | Nonaka | 463/30 |
| 2004/0214637 | A1 | 10/2004 | Nonaka | 463/31 |
| 2004/0219965 | A1 | 11/2004 | Okada | 463/16 |
| 2004/0224747 | A1 | 11/2004 | Okada | 463/16 |
| 2004/0224758 | A1 | 11/2004 | Okada et al. | 463/31 |
| 2004/0227286 | A1 | 11/2004 | Tanimura et al. | 273/143 |
| 2004/0227866 | A1 | 11/2004 | Okada | 349/58 |
| 2004/0229680 | A1 | 11/2004 | Hoshino et al. | 463/20 |
| 2004/0229686 | A1 | 11/2004 | Tanimura et al. | 463/30 |
| 2004/0242323 | A1 | 12/2004 | Okada | 463/31 |
| 2004/0266510 | A1 | 12/2004 | Kojima | 463/16 |
| 2004/0266515 | A1 | 12/2004 | Gauselmann | 463/20 |
| 2004/0266521 | A1 | 12/2004 | Kojima | 463/20 |
| 2005/0020349 | A1 | 1/2005 | Tachikawa | 463/20 |
| 2005/0032571 | A1 | 2/2005 | Asonuma | 463/20 |
| 2005/0049030 | A1 | 3/2005 | Tachikawa | 463/20 |
| 2005/0049032 | A1 | 3/2005 | Kobayashi | 463/20 |
| 2005/0054433 | A1 | 3/2005 | Iwamoto | 463/25 |
| 2005/0140088 | A1 | 6/2005 | Randall | 273/143 |
| 2005/0153775 | A1 | 7/2005 | Griswold et al. | 463/30 |
| 2005/0170879 | A1 | 8/2005 | Tachikawa | 463/16 |
| 2005/0187003 | A1 | 8/2005 | Adachi et al. | 463/16 |
| 2005/0187006 | A1 | 8/2005 | Tachikawa | 463/20 |
| 2005/0187007 | A1 | 8/2005 | Kuroiwa | 463/20 |
| 2005/0187009 | A1 | 8/2005 | Osawa | 463/20 |
| 2005/0192083 | A1 | 9/2005 | Iwamoto | 463/20 |
| 2005/0192084 | A1 | 9/2005 | Iwamoto | 463/20 |
| 2005/0192085 | A1 | 9/2005 | Iwamoto | 463/20 |
| 2005/0192090 | A1 | 9/2005 | Muir et al. | 463/30 |
| 2005/0255908 | A1 | 11/2005 | Wells | 463/20 |
| 2005/0272500 | A1 | 12/2005 | Tanimura et al. | 463/20 |
| 2005/0282616 | A1 | 12/2005 | Tanimura et al. | 463/20 |
| 2005/0282617 | A1 | 12/2005 | Sekiguchi et al. | 463/20 |
| 2006/0014580 | A1 | 1/2006 | Hawthorn | 463/20 |
| 2006/0089192 | A1 | 4/2006 | Okada | 463/20 |
| 2006/0128467 | A1 | 6/2006 | Thomas | 463/31 |
| 2006/0135248 | A1 | 6/2006 | Anderson et al. | 463/22 |
| 2006/0252496 | A1 | 11/2006 | Rasmussen | 463/20 |
| 2006/0281530 | A1 | 12/2006 | Seelig et al. | 463/20 |
| 2007/0004513 | A1 | 1/2007 | Wells et al. | 463/31 |
| 2007/0054730 | A1 | 3/2007 | Mattice et al. | 463/16 |
| 2007/0060296 | A1 | 3/2007 | Yoshizawa | 463/20 |
| 2007/0123348 | A1 | 5/2007 | Nozaki | 463/30 |
| 2007/0149281 | A1 | 6/2007 | Gadda et al. | 463/34 |
| 2007/0184893 | A1 | 8/2007 | Fujimoto | 463/20 |
| 2008/0020820 | A1 | 1/2008 | Iwamoto | 463/20 |
| 2008/0125210 | A1 | 5/2008 | Iwamoto | 463/20 |
| 2008/0176653 | A1 | 7/2008 | Kishi | 463/31 |
| 2008/0261674 | A9 | 10/2008 | Okada | 463/16 |
| 2008/0311977 | A1 | 12/2008 | Okada | 463/20 |
| 2009/0131148 | A1 | 5/2009 | Loose et al. | 463/20 |
| 2009/0181758 | A1 | 7/2009 | Loose et al. | 463/20 |
| 2009/0247276 | A1 | 10/2009 | Okada | 463/20 |

FOREIGN PATENT DOCUMENTS

| | | | | |
|---|---|---|---|---|
| AU | 2000-030185 | | | 11/2000 |
| CA | 2282782 | | | 3/2000 |
| DE | 19800724 | A1 | | 7/1999 |
| EP | 0060019 | | | 9/1982 |
| EP | 579505 | A1 | * | 1/1994 |
| EP | 0789338 | | | 8/1997 |
| EP | 1260928 | A2 | | 11/2002 |
| EP | 1376494 | | | 1/2004 |
| EP | 1376495 | | | 1/2004 |
| EP | 1424663 | | | 6/2004 |
| GB | 2124505 | A | | 2/1984 |
| GB | 2165074 | A | | 4/1986 |
| GB | 2242052 | A | | 9/1991 |
| GB | 2253299 | A | | 9/1992 |
| GB | 2349494 | A | | 11/2000 |
| JP | 60-061079 | | | 4/1985 |
| JP | 61-279272 | | | 12/1986 |
| JP | 01-185741 | | | 7/1989 |
| JP | 2019182 | | | 1/1990 |
| JP | 08080364 | A | | 1/1990 |
| JP | 04-037791 | A | | 2/1992 |
| JP | 04-109977 | | | 4/1992 |
| JP | 04-114676 | | | 4/1992 |
| JP | 1992-220275 | | | 8/1992 |
| JP | 04-341288 | | | 11/1992 |
| JP | 05-123441 | | | 5/1993 |
| JP | 05-177043 | | | 7/1993 |
| JP | 06-039085 | | | 2/1994 |
| JP | 06-047150 | | | 2/1994 |
| JP | 1994-142279 | | | 5/1994 |
| JP | 07-016340 | | | 1/1995 |
| JP | 07-031728 | A | | 2/1995 |
| JP | 07-124290 | | | 5/1995 |
| JP | 07-299189 | | | 11/1995 |
| JP | 08-010381 | | | 1/1996 |
| JP | 08010381 | A | * | 1/1996 |

| | | | | |
|---|---|---|---|---|
| JP | 08-103541 | | | 4/1996 |
| JP | 2531253 | | | 1/1997 |
| JP | 09-207625 | | | 8/1997 |
| JP | 10-071228 | | | 3/1998 |
| JP | 10-091076 | | | 4/1998 |
| JP | 10-198325 | A | | 7/1998 |
| JP | 10-305130 | | | 11/1998 |
| JP | 10-328398 | | | 12/1998 |
| JP | 11-090017 | | | 4/1999 |
| JP | 11-099240 | | | 4/1999 |
| JP | 11-114136 | A | | 4/1999 |
| JP | 11-137774 | | | 5/1999 |
| JP | 11-152970 | | | 6/1999 |
| JP | 11-153970 | | | 6/1999 |
| JP | 11-206960 | | | 8/1999 |
| JP | 11206960 | A | * | 8/1999 |
| JP | 11-244451 | | | 9/1999 |
| JP | 11-253610 | | | 9/1999 |
| JP | 11253610 | A | * | 9/1999 |
| JP | 2000-011725 | | | 1/2000 |
| JP | 2000-098962 | A | | 4/2000 |
| JP | 2000-189554 | | | 7/2000 |
| JP | 2000-262738 | | | 9/2000 |
| JP | 2000-300729 | | | 10/2000 |
| JP | 2000-300731 | | | 10/2000 |
| JP | 2000-350805 | | | 12/2000 |
| JP | 2001-025546 | | | 1/2001 |
| JP | 2001-058046 | | | 3/2001 |
| JP | 2001-062032 | | | 3/2001 |
| JP | 2001-083927 | A | | 3/2001 |
| JP | 2001-087532 | | | 4/2001 |
| JP | 2001-120715 | A | | 5/2001 |
| JP | 2001-134244 | A | | 5/2001 |
| JP | 2001-137461 | | | 5/2001 |
| JP | 2001-142452 | A | | 5/2001 |
| JP | 2001-161892 | | | 6/2001 |
| JP | 2001-198289 | | | 7/2001 |
| JP | 2001-198316 | A | | 7/2001 |
| JP | 2001-238995 | | | 9/2001 |
| JP | 2001-252393 | | | 9/2001 |
| JP | 2001-252394 | | | 9/2001 |
| JP | 2002-113150 | | | 4/2002 |
| JP | 2002-116729 | A | | 4/2002 |
| JP | 2002-136652 | | | 5/2002 |
| JP | 2002-272903 | A | | 9/2002 |
| JP | 2002-290997 | A | | 10/2002 |
| JP | 2003-236037 | | | 8/2003 |
| JP | 2003-260184 | | | 9/2003 |
| JP | 2004-008705 | | | 1/2004 |
| RU | 2000128696 | | | 10/2002 |
| RU | 2001103774 | | | 1/2003 |
| WO | WO 98/03962 | A1 | | 1/1998 |
| WO | WO-9953454 | A1 | | 1/1999 |
| WO | WO 99/64997 | A1 | | 12/1999 |
| WO | WO 00/32286 | A1 | | 6/2000 |
| WO | WO 01/28647 | A1 | | 4/2001 |
| WO | WO 01/72387 | A1 | | 10/2001 |
| WO | WO-03039699 | A1 | | 5/2003 |
| WO | WO 2006/036948 | A2 | | 4/2006 |
| WO | WO 2006/124976 | A1 | | 11/2006 |
| WO | WO 2007/011717 | A2 | | 1/2007 |

OTHER PUBLICATIONS

Notice of Reasons for Rejection, Mailing No. 147919, Apr. 26, 2005.

International Serach Report, mailed on May 13, 2004.

JPO Inquiry, App. No. 2003-054664, Trans. No. 032762, Trans. Date: Apr. 1, 2008 (3 pages).

JPO Notice of Reasons for Rejection, App. No. 2002-337133, Trans. No. 122229, Trans. Date: Nov. 11, 2008 (4 pages).

JPO Decision of Appeal Trial, Trans. No. 126363, Trans. Date: Dec. 9, 2008 (10 pages).

EPO Office Action, App. No. 03 026 652.2-2218, Dec. 30, 2008 (4 pages).

JPO Appeal Decision, App. No. 2003-54664, Trans. No. 017648, Trans. Date Mar. 24, 2009 (7 pages).

JPO Appeal Decision, App. No. 2003-54665, Trans. No. 017619, Trans. Date Mar. 24, 2009 (8 pages).

“Bigfoot” Product Sheet, Shuffle Master, Inc., 1 page (2000).

“Big Games Safari” Product Sheet, IGT, 24 pages (2000).

“Cabby Cash™” Product Sheet, Anchor Gaming, 2 pages (2000).

“Congo Quest™” Product Sheet, Anchor Gaming, 2 pages (2000).

“Fishin’ Buddies™” Product Sheet, Anchor Gaming, 2 pages (2000).

Legato, Frank, “The Full Monty,” Strictly Slots, pp. 48-50 (Jun. 1999).

“Goooaal!” Product Sheet, Bally Gaming, Inc., 2 pages (2000).

“Great Whites” Product Sheet, VLC, Inc., 2 pages (2000).

“Jackpot Stampede Deluxe™” Product Sheet, WMS Gaming Inc., 2 pages (1997).

“Loaded Dice” Product Sheet, Konami Gaming, 2 pages (2000).

“Neptune’s Pearls” Product Sheet, Unidesa Gaming, 4 pages (1998).

“Penguin Pays” Product Sheet, Aristocrat Incorporated, 2 pages (1998).

“Stroke of Luck™” Product Sheet, WMS Gaming Inc., 2 pages (1997).

“Wild Cougar” Article, Strictly Slots, p. 44 (Feb. 1999).

“Yahtzee® Brand Video Game” Product Brochure, Hasbro, Inc., 2 pages (2000).

* cited by examiner

GAMING MACHINE AND DISPLAY DEVICE THEREFOR

CROSS-REFERENCE TO RELATED APPLICATION

This application is based upon and claims the benefit of priority from the prior Japanese Patent Application No. 2002-337131 filed on Nov. 20, 2002, the entire contents of which are incorporated herein by reference.

FIELD OF THE INVENTION

The present invention relates to a gaming machine and a display device for the gaming machine.

RELATED ART

In recent years, a gaming machine such as a pinball gaming machine (e.g., pachinko machine) or a pinball slot machine (e.g., pachi-slot machine) has spread widely, and various types of gaming machines are developed and sold by gaming machine makers.

This gaming machine is provided in a cabinet thereof with a display unit, in which there are displayed various images such as an image indicating the game contents or an image for making a scene. This display unit is indispensable for such gaming machines.

For this display unit, a CRT (Cathode Ray Tube) using a cathode-ray tube, and various kinds of liquid crystal displays such as an STN (Super-Twisted Transistor) type, a TFT (Thin Film Transistor) type, etc. This display unit is installed on the cabinet so that a projecting portion thereof sticks out inside the cabinet of the gaming machine. In order to reduce the size of the gaming machine, therefore, a thin type liquid crystal display has become in the mainstream (see JP-A-2002-272903, for example).

In this gaming machine, however, an uncomfortable image may be displayed due to a trouble in the liquid crystal display thereby to obstruct the interest of the player.

This uncomfortable image may be caused, for example, by noise, static electricity, or the like. It is preferable to eliminate such uncomfortable image as much as possible.

SUMMARY OF THE INVENTION

The present invention has an object to provide a gaming machine, which can maintain interest of a player even when a part of the gaming machine does not function well.

According to the present invention, in order to achieve the above-mentioned object, the gaming machine comprises: display control means; and image state control means for receiving an image signal provided from the display control means to display an image on display means and for controlling the display means into a predetermined state when the image signal is abnormal (or not normal). Here, the display means may include a general display device. Moreover, the display control means may include a control device relating to a general display. Further, the image state control means may include a control device relating to the general image display.

More specifically, the present invention provides the following.

(1) A gaming machine comprising: a display device for displaying an image relating to a game; and an image state control unit for controlling the image to be displayed, wherein the image state control unit controls the display device into a predetermined state upon determination that an image signal relating to the image provided to the display device fails to satisfy a predetermined condition.

Here, the case that a predetermined condition is not satisfied may refer to that the image may cause an uncomfortable feeling to a player when the image is displayed on the display device according to the image signal. For example, the case may be that an image is made hardly visible with noise, that the original image to be shown does not exist, or that the image contains something obstructing the game progress if the player sees it. Further, to control the display device into the predetermined state may include to control the image to be displayed on the display device, and to display a predetermined image. The predetermined image may be based on the image signal or may have no relation to the image signal. Further, the predetermined image may be a moving picture, a still picture, or a combination thereof. Thus, the display image is controlled so that no uncomfortable image would be displayed. Therefore, the uncomfortable image, as caused by various troubles, can be prevented from being displayed in the display device.

Further, to control the display device into the predetermined state may include to make reels and the like behind the display device become visible through the display device when the power source of the gaming machine is ON. When the power source of the gaming machine is ON and the gaming machine is working, more specifically, the image may be disturbed for some cause. At this time, however, the image having no disturbance can be displayed and a so-called "white image" making visible the reels and the like behind the display device can be displayed.

If the image is displayed with the disturbance caused by the malfunctioning display device, or the malfunctioning display control means, or by the failure in the power source supply, for example, the player may feel uncomfortable. Unless the disturbed image is displayed, therefore, the interest of the player could remain for a longer time.

(2) The gaming machine according to (1) is characterized in that the image state control unit converts the image signal and provides the image signal as an enlarged image signal to the display device.

According to the construction described above, the image signal is enlarged and converted. Then, a larger image than usual according to the converted image signal is displayed on the display device. Therefore, it is possible to provide a game having dynamic effects. As the image becomes larger, however, it exerts more influences on the player. If an uncomfortable image is displayed in an enlarged manner, therefore, its influences may be serious. Especially if such enlarged and converted image is displayed, it may give a rather seriously uncomfortable feeling to the player. It is, therefore, more preferable to eliminate the cause for the uncomfortable feeling during the play. On the other hand, the uncomfortable feeling can be alleviated by controlling the display device into the predetermined state even if the enlarged and converted image is displayed.

(3) The gaming machine according to (1) or (2) further comprises a rotatable reel with a plurality of symbols drawn on an outer periphery thereof. The rotatable reel is disposed behind the display device such that at least a part of the symbols is visible through the display device when the display device is controlled to show the image in the predetermined state.

With the above construction, the gaming machine having the display device disposed in front of the reel to which the player pays the most attention can provide a game having dynamic effects. As the display device is positioned on a place with more attention, the influence of the image on the player becomes higher. If the display device is thus disposed in front of the reel, more serious influence can be given to the player. Therefore, it is preferable to eliminate the causes, which could cause the uncomfortable feeling during the play.

(4) The gaming machine according to any one from (1) to (3) further comprises a control device for controlling the display device such that at least the part of the symbols becomes more visible when the display device is controlled into the predetermined state.

The turnable reel with the symbols drawn on an outer periphery thereof is disposed behind the display device so that the player can see (or view) the reel through the display device. The display device is so controlled, if necessary, that at least one or a portion of the symbols (i.e., a part of the symbols) on the outer periphery of the reel can be viewed by the player.

(5) The gaming machine according to any one from (1) to (4) is characterized in that at least a part of the display device is substantially light transparent when the display device does not function normally or malfunctions.

Here, that the display device does not function normally may include that a normal image on the basis of the image signal is not displayed whether the image signal satisfies the predetermined condition or not. For example, it may include that a sufficient power is not provided to the display device, that the power or another input is abnormal, or that the predetermined image is not displayed as it is even when the image signal or data thereof relating to the predetermined image is provided to the display device. As referred to at least a part of the display device, the part may include a portion like a window on the display screen of the display device. Further, to be light transparent may include to be semi-transparent so that the reel may be visible through the display device with an ordinary vision as well as to be substantially transparent. More than one portion like a window as described above may be formed on the display screen.

(6) The gaming machine according to any one from (1) to (5) is characterized in that the image state control unit is positioned higher than the display device.

With the above-described construction, the possibility that the player contacts with the image state control unit player is lowered so that the image state control unit is less influenced by static electricity caused by the contact with the player.

Especially in a dry area where the static electricity is frequently caused, moreover, the image state control unit is positioned at the upper portion of the gaming machine and it seems that the static electricity is driven to the ground disposed in the cabinet so that the image state control unit may be hardly influenced by the static electricity.

(7) A display device for a gaming machine comprises: a display device for displaying an image corresponding to a provided image signal; and an image state control unit for controlling the image by receiving the image signal and transmitting the image signal to the display device, wherein the image state control unit controls the display device into a predetermined state when it is determined that the image signal relating to the image being provided to the display device fails to satisfy a predetermined condition.

By combining the display device and the gaming machine, it is possible to construct the gaming machine with a display. By combining the gaming machine having a display device with the display device, the gaming machine can be provided with a main or sub display device.

(8) A gaming machine comprises: display means for displaying an image; display control means for causing the display means to display the image relating to a game; and image state control means for controlling the display means into a predetermined state when it is determined that the image signal fails to satisfy a predetermined condition upon receiving an image signal, as data relating to the image, transmitted from the display control means.

(9) The gaming machine according to (8) is characterized in that the image state control means converts the image signal and transmits the image signal as an enlarged image signal to the display means.

(10) The gaming machine according to (8) or (9) further comprises symbol variable display means being disposed behind the display means for displaying a plurality of symbols such that at least a part of the symbol variable display means is visible through the display means when the display means is controlled into the predetermined state.

(11) The gaming machine according to any one from (8) to (10) further comprises visibility control means for controlling the display means more visible when the display means is controlled into the predetermined state.

Further features of the invention, its nature, and various advantages will be more apparent from the accompanying drawings and the following detailed description of the invention.

DETAILED DESCRIPTION OF THE INVENTION

The present invention will be described in connection with its embodiment with reference to the accompanying drawings. In this embodiment to be described, the present invention is applied to a slot machine such that a plurality of mechanical rotary reels are used as variable display devices for variably displaying a plurality of kinds of symbols necessary for a game. However, it should be noted that the present invention could apply to any kinds of gaming machines such as a pinball gaming machine, a medal gaming machine, a card gaming machine, and so on.

[Construction of Gaming Machine]

Figure 1:
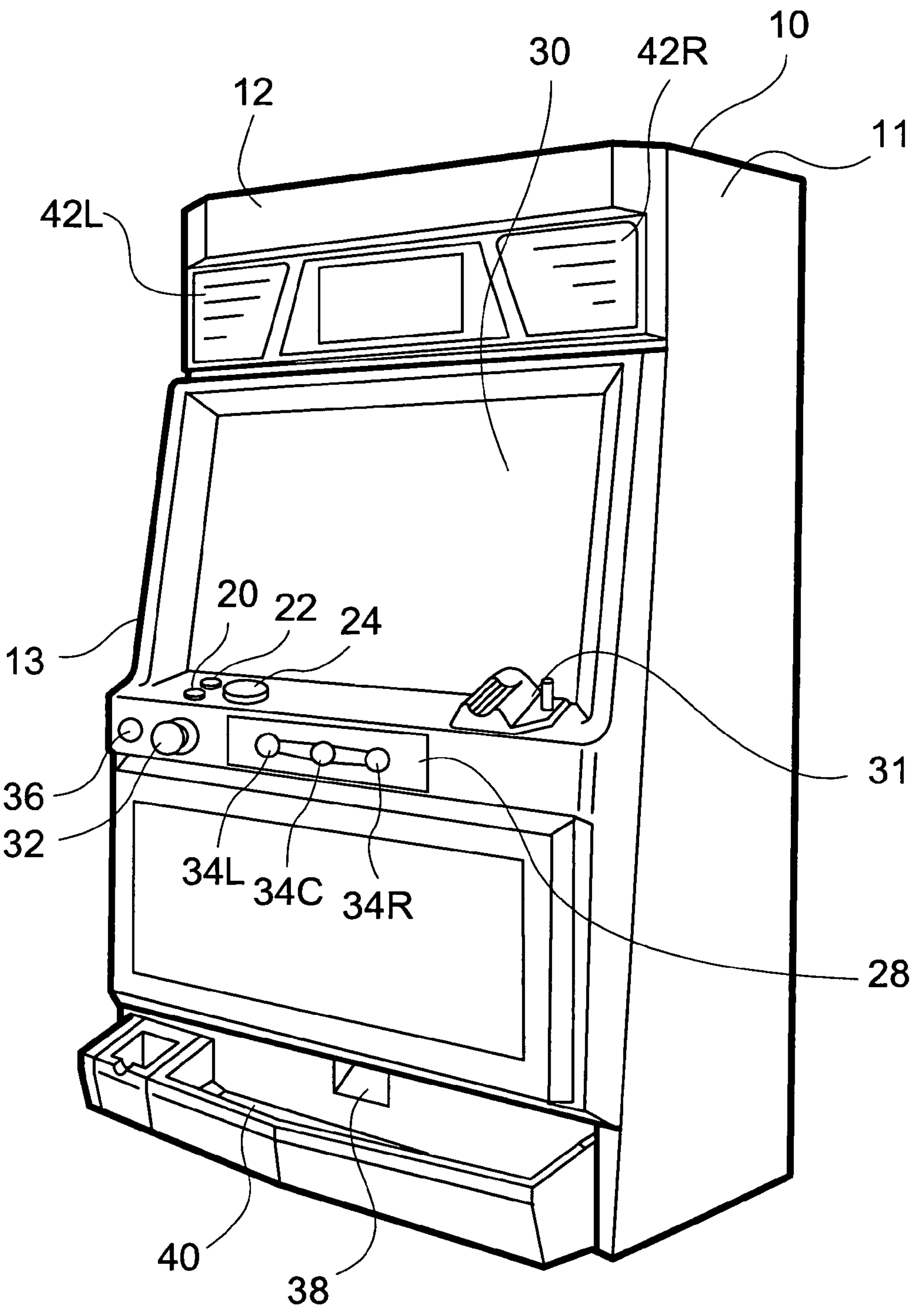
FIG. 1 is a perspective view of an outline of a slot machine according to an embodiment of the present invention.

A slot machine 10 is schematically shown in FIG. 1.

A cabinet 12 enclosing the slot machine 10 is composed of a main body 11 and a door 13.

On the front face of the cabinet 12 defining an outer shape of the slot machine 10, a rectangular display device 30 is provided. This display device 30 comprises a liquid crystal display for displaying various images such as images for informing the game contents or effect images for entertaining the player.

Moreover, the display device 30 can display images in XGA, which is 1,024 bits (width) by 768 bits (height) and includes 8 bits of red data, green data, and blue data, as described later.

Moreover, this display device 30 can be controlled to show a relatively highly transparent image so that the reels 26L, 26C and 26R (see FIG. 2) disposed behind the display device 30 may be visible to the player.

Moreover, the display device 30 is provided with a touch panel 51 (see FIG. 6) so that the player can perform various operations.

Figure 2:
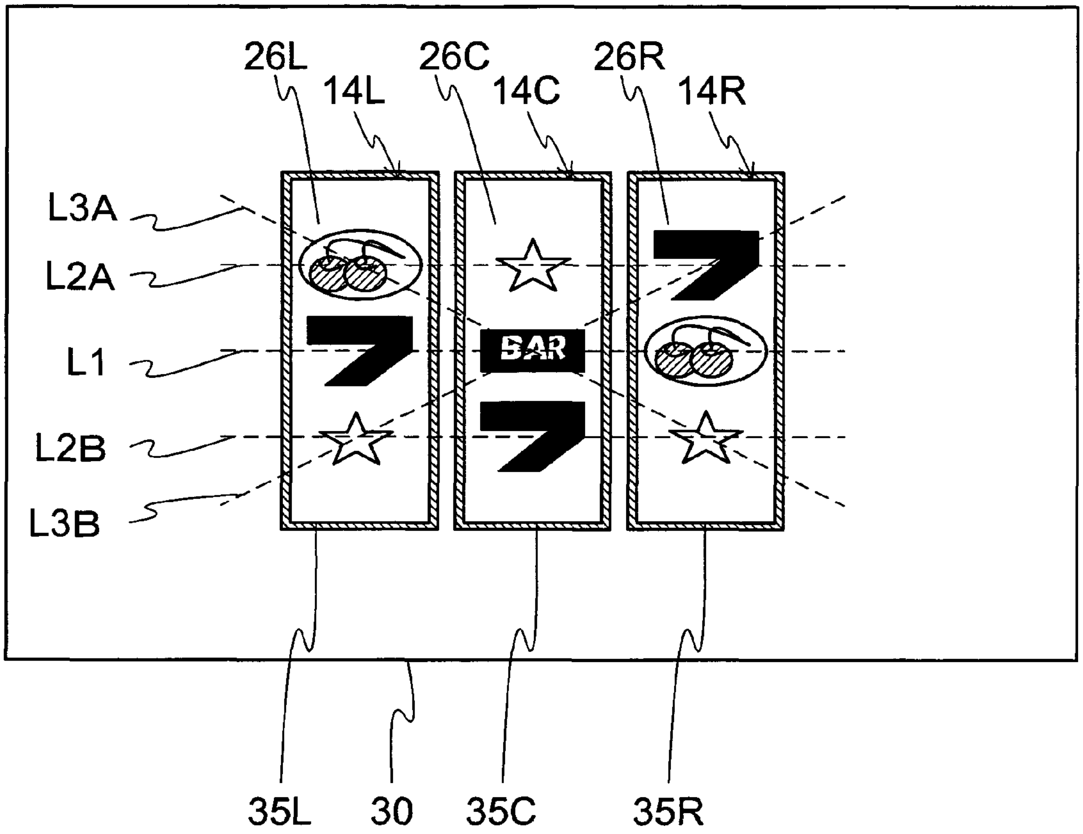
FIG. 2 shows schematically a display screen of the slot machine according to the embodiment of the present invention.

The display device 30 is provided with rectangular display windows 14 (14L, 14C and 14R), as shown in FIG. 2. The display device 30 is provided with a later-described mask 33 (see FIG. 4) so that only the reels 26L, 26C and 26R may be visible to the player through the display windows 14 when the display device 30 shows relatively high transparent images.

Inside the cabinet 12, the three reels 26L, 26C and 26R are rotatably provided, each of which has a plurality of description information images (e.g., symbols) drawn on the outer periphery. Each of the reels 26L, 26C and 26R can be viewed through the aforementioned display windows 14.

Moreover, the reels 26L, 26C and 26R are rotatably driven such that the symbols drawn on the outer peripheries of the reels 26L, 26C and 26R may be seen through the display windows 14 to move downward. When each of the rotating reels 26L, 26C and 26R is stopped, three symbols drawn on the outer peripheries of the three reels are visible through the display windows 14.

As shown in FIG. 1, a frontward projection portion 28 with a substantially horizontal upper face is disposed below the display device 30, and a medal insertion slot 31 is disposed on the right side on the upper face of the projection portion 28.

On the left side on the upper face of the projection portion 28, a 1-BET switch 20 for betting only one medal out of the inserted medals, a 2-BET switch 22 for betting only two medals out of the inserted medals, and a MAX-BET switch 24 for betting the maximum number of medals for one play out of the inserted medals are disposed.

As shown in FIG. 2, when the player operates the 1-BET switch 20, only a pay-line L1 composed of a combination of three symbols at respective middle positions of the three respective reels is activated for determination of the game result (such combination of the three symbols for determination of the game result will be referred to as "activated line.").

When the 2-BET switch 22 is operated, three pay-lines composed of the aforementioned pay-line L1 and two more pay-lines L2A, L2B are activated as shown in FIG. 2. The two pay-lines L2A, L2B are composed of respective two combinations, each of which is composed of three symbols at lower or upper position on the respective three reels.

When the MAX-BET switch 24 is operated under a condition that three or more medals are inserted and deposited, five pay-lines L1, L2A, L2B, L3A, and L3B are activated. The five pay-lines are composed of the aforementioned three activated pay-lines; a pay-line L3A composed of a combination of the upper symbol on the reel 26L, the middle symbol on the reel 26C, and the lower symbol on the reel 26R; and a pay-line L3B composed of a combination of the lower symbol on the reel 26L, the middle symbol on the reel 26C, and the upper symbol on the reel 26R.

However, if the number of deposited medals out of the inserted medals is two, only three pay-lines L1, L2A, and L2B of the aforementioned five pay-lines are activated. If the number of deposited medals out of the inserted medals is one, only one pay-line L1 out of the five pay-lines is activated. The activated pay-lines are notified to the player by displaying how the pay-lines are activated beside the display windows 14.

By pushing one of the BET switches 20, 22, and 24, the aforementioned pay-line or pay-lines are activated as mentioned above. The gaming machine 10 is ready for starting a game when the aforementioned 1-BET switch 20, 2-BET switch 22, or MAX-BET switch 24 is pushed by the player.

As shown in FIG. 1, a tiltable start lever 32 is disposed on the left side of the front face of the projection portion 28. When the start lever 32 is tilted by the player, the rotations of the aforementioned three reels 26L, 26C and 26R are started all at once. When these three reels 26L, 26C and 26R are rotated, the symbols drawn on the individual outer peripheries of the reels 26L, 26C, and 26R are variably displayed through the display windows 14. When the rotating speeds of the three reels 26L, 26C, and 26R reach a predetermined level, stop buttons 34L, 34C, and 34R become operative by the player as described later.

Here, the slot machine having the stop buttons is employed for the embodiment, but the present invention may also be applied to a slot machine without such stop buttons. Further, the rotation of the reels may also be stopped automatically after a predetermined period of time elapses or after the rotational speed reaches a predetermined one.

The projection portion 28 is provided near the center of its front face with the three stop buttons 34L, 34C, and 34R. The stop button 34L corresponds to the reel 26L, the stop button 34C corresponds to the reel 26, and the stop button 34R corresponds to the reel 26R. When the player pushes the stop button 34L, the reel 26L is stopped; when the player pushes the stop button 34C, the reel 26C is stopped; and when the player pushes the stop button 34R, the reel 26R is stopped.

A deposited-medal adjusting button 36 is disposed on the left side of the start lever 32. When the player pushes the deposited-medal adjusting button 36, the deposited medals are paid out from a medal payout opening 38 disposed in a lower portion on the front face, and the medals paid out are accumulated in a medal receiving tray 40.

On the upper side of the slot machine 10, speaker grills 42 (42L and 42R) for passing sound emitted from speakers (as referred to FIG. 8) enclosed in the cabinet 12 to the outside of the cabinet 12.

A predetermined number (e.g., 21) of symbols are drawn on the outer periphery of each of the aforementioned reels 26L, 26C, and 26R. Depending on the combination of three symbols in at least one of the activated pay-lines visible through the display windows 14 when the reels 26L, 26C, and 26R are stopped, some number of medals are paid out, or the game shifts to a more advantageous mode for the player.

[Display Mode of Gaming Machine]

The aforementioned display device 30 will be described referring to FIGS. 2 to 4.

The display device 30 may display not only the various kinds of images but also highly transparent images. The highly transparent images may include images drawn in highly transparent color tones on the liquid crystal display device. If the highly transparent images are displayed in the display windows 14, the background reel symbols can be viewed although they are recognized with different color tones from the original tones. Various images and highly transparent images may be displayed all over the screen as well as a local part of the screen.

When the display device 30 shows highly transparent images through the display windows 14, the reels 26L, 26C and 26R, which are actually disposed behind the display device 30, can be made visible to the player, as shown in FIG. 2. Edging images 35 (35L, 35C and 35R) may be displayed along the peripheral edges of the reels 26L, 26C, and 26R.

Figure 3:
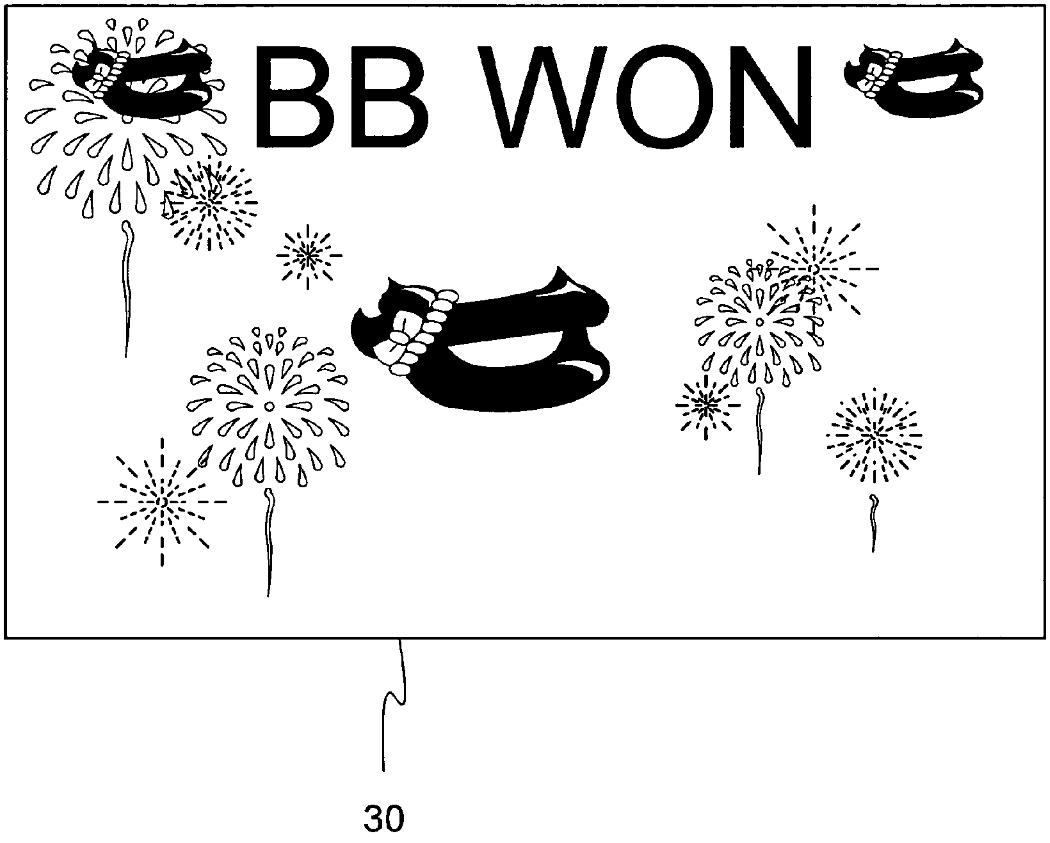
FIG. 3 shows schematically a display screen of the slot machine according to the embodiment of the present invention.

In addition to highly transparent images on the display device 30, various effect images using the hardly transparent color tones (so-called "black output") can be displayed so as to make the background invisible to the player, as shown in FIG. 3. The reels 26L, 26C, and 26R behind the display device may become invisible.

Figure 4:
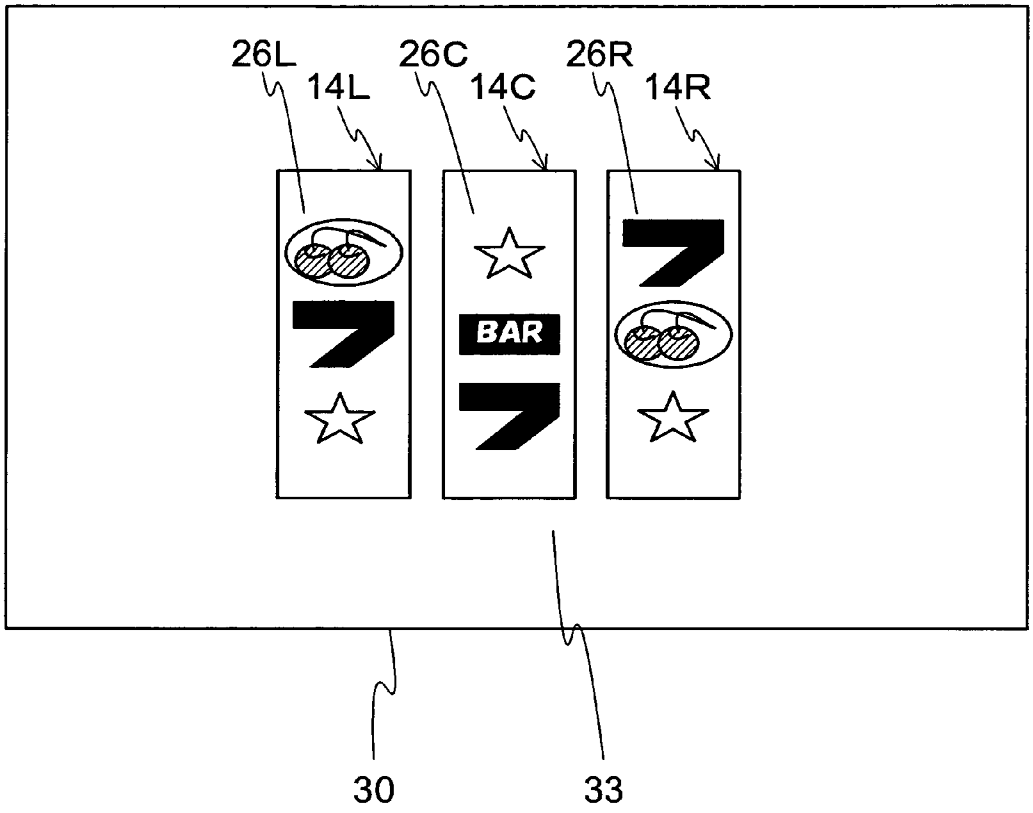
FIG. 4 shows schematically a display screen of the slot machine according to the embodiment of the present invention.

The whole screen of the display device 30 can be highly transparent so that the reels 26L, 26C and 26R through the display windows 14 and the mask 33 along the peripheral edges of the display windows 14 can be viewed by the player, as shown in FIG. 4. The mask 33 is thus formed so that only the necessary minimum portion but not the remaining portion is visible to the player.

[Board Construction of Gaming Machine]

Figure 5:
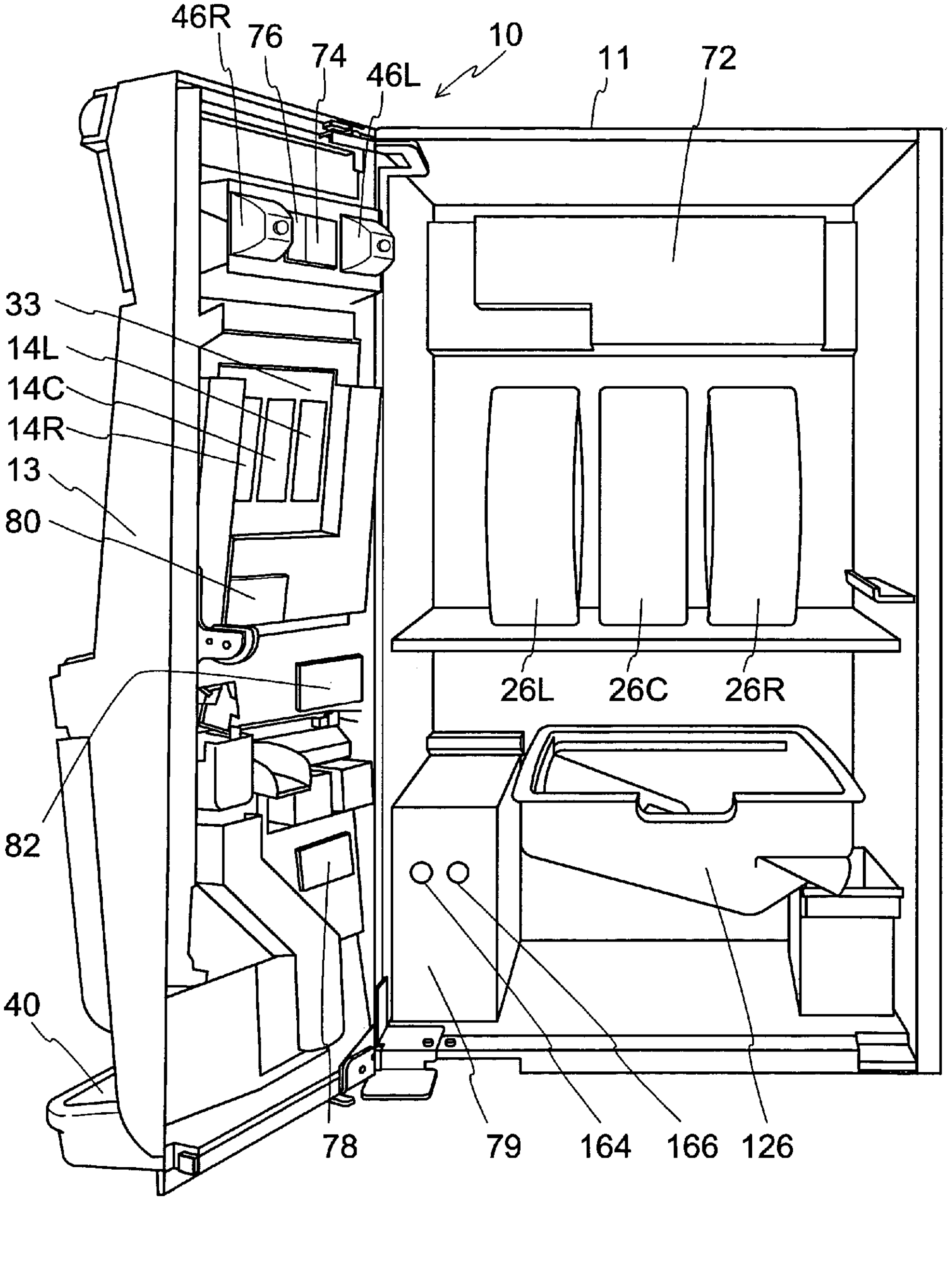
FIG. 5 is a perspective view of the developed slot machine according to the embodiment of the present invention.

A schematic diagram showing the cabinet inside of the slot machine is shown in FIG. 5. Here, in FIG. 5, the door 13 is opened with the slot machine 10.

In the slot machine 10, as shown in FIG. 5, there are mounted various devices and various control boards.

As shown in FIG. 5, the reels 26L, 26C, 26R, a hopper 126 for holding game media, and a power source device 79 for feeding the electric power to the whole slot machine 10 are provided inside the main body 11 of the slot machine 10. There are also provided various boards and devices such as a main control board 72, on which a main control circuit 100 (see FIG. 8) including a random number generator 116 (see FIG. 8) for generating a random number for the lotteries whether an advantageous condition for the player is established or not and a main CPU 102 (see FIG. 8) inside the main body 11.

On the door 13 side of the slot machine 10, there are provided various devices and various control boards including a sub-control board 74, a scale board 76, a lamp control board 78, an image display subsidiary board 80, and a power source relay board 82.

On these boards, various circuits are provided.

A sub control circuit 200 (see FIG. 8) for determining various effect modes independently or on the basis of signals and instructions from the main control circuit 100, is provided on the sub-control board 74.

A scale circuit 400 (see FIG. 8) is provided on the scale board 76 for enlarging and converting the image signal provided from the sub-control board 74 so as to display the image in an enlarged mode on the display device 30 and for monitoring the signal provided from the sub-control board 74 so as to control the display device 30 if anything not normal occurs.

A lamp control circuit 300 (see FIG. 8) for making lamp effect and sound effect on the basis of the effect signal provided from the sub-control board 74 is provided on the lamp control board 78.

An image display subsidiary circuit (not shown), which constitutes the display device 30, drives the image signal provided from the scale board 76, and controls liquid crystal backlights 292 (see FIG. 11) of the display device 30, is provided on the image display subsidiary board 80.

A power source relay board 82, which is provided on the other hand, functions to receive the whole power from the power source device 79 and to distribute the power independently to the aforementioned boards and devices.

The aforementioned sub-control board 74 and scale board 76 are provided in the upper portion of the door 13.

That is, the image state control unit thus far described is built in the upper portion of the gaming machine. Therefore, the image state control unit is not located in a lower portion of the gaming machine so as not to be contacted by the player. Therefore, it is hardly influenced by the static electricity which may be caused by the contact with the player.

The image signal control unit thus far described is built in the upper portion of the gaming machine. Therefore, the image signal control unit is not in the lower portion of the gaming machine, but in the upper portion of the gaming machine so that it is hardly influenced by the static electricity, as might be caused by the contact with the player.

Moreover, the image display unit is built in the upper portion of the gaming machine under consideration and has little contact with the player so that it is hardly influenced by the static electricity, as might otherwise be generated by the contact with the player.

With the construction thus far described, the static electricity may occur more frequently especially in a dry areas outside of Japan. Even if the static electricity occurs, the image state control unit is disposed in the upper portion of the gaming machine so that the static electricity generated may not affect the image state control unit since it may flow into the ground on the cabinet. Thus, the construction is effective for countermeasures against the static electricity.

The lamp control board 78 is provided in the lower portion of the door 13. As compared with the sub-control board 74 and the scale board 76, however, the lamp control board 78 is more hardly influenced by the output of the static electricity. Therefore, the lamp control board 78 may be disposed at that position because of the space arrangement.

Here, in the slot machine 10 according to the present embodiment, while the main control board 72 is disposed in the main body 11; the sub-control board 74 and the remaining boards are disposed in the door 13. However, the present invention should not be limited thereto. It is also possible to dispose the sub-control board 74 and the remaining boards in the main body 11, and the main control board 72 in the door 13.

The power source device 79 is provided with a reset switch 164, a setting switch 166, and so on.

[Structure of Display Device]

Figure 6:
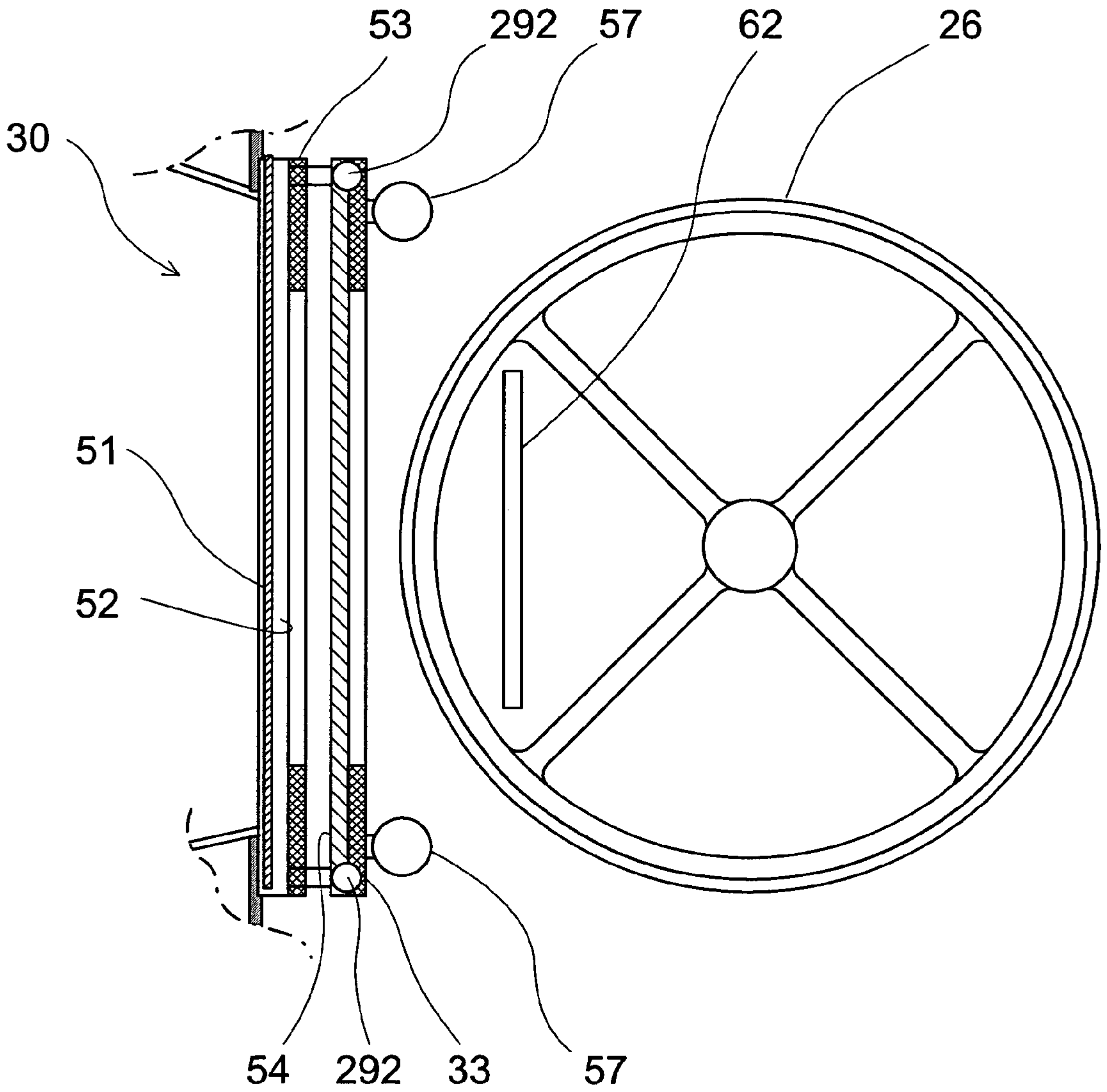
FIG. 6 explains a display device of the slot machine according to the embodiment of the present invention.

The detail of the display device 30 with the slot machine 10 will be described with reference to FIG. 6.

The door 13 is provided with the display device 30, on which the various effect images may be displayed.

A symbol sheet 53 composed of various symbols printed on a transparent film member being provided on the inner side of the touch panel 51 for detecting the coordinate position contacted by the player and a transparent acryl plate 52 acting as a protective cover, and a liquid crystal display device 54 being composed of a transparent liquid crystal display device such as an ITO are provided in a laminated manner in the display device 30.

In the upper and lower portions of the liquid crystal display device 54, the liquid crystal backlights 292 are provided as backlights for the liquid crystal display device 54. The liquid crystal backlights 292 are controlled so that they are turned ON when the power is fed. The liquid crystal backlights 292 always get ON when the power supply is fed. Therefore, the images to be displayed in the liquid crystal display device 54 could be made clearly visible to the player. In the liquid crystal backlights 292, cold-cathode tubes are usually used, but the present invention should not be limited to this.

In the upper and lower portions on the inner face side of the display device 30, symbol illuminating lamps 57 are disposed as an illuminating device for illuminating the symbols on the reels 26. The symbol illuminating lamps 57 are controlled to be turned ON when they are provided with the power. If the symbol illuminating lamps 57 are ON at all times, the symbols can be clearly viewed. In the symbol illuminating lamps 57, the cold-cathode tubes are usually employed, but the present invention should not be limited to this.

The symbols drawn on the symbol sheet 53 are not influenced by the effect control state of the slot machine 10 so that they can always be viewed by the player. The liquid crystal display device 54 comprises a display area for image effects such as the big bonus hit effect and various kinds of notification effects.

Figure 7:
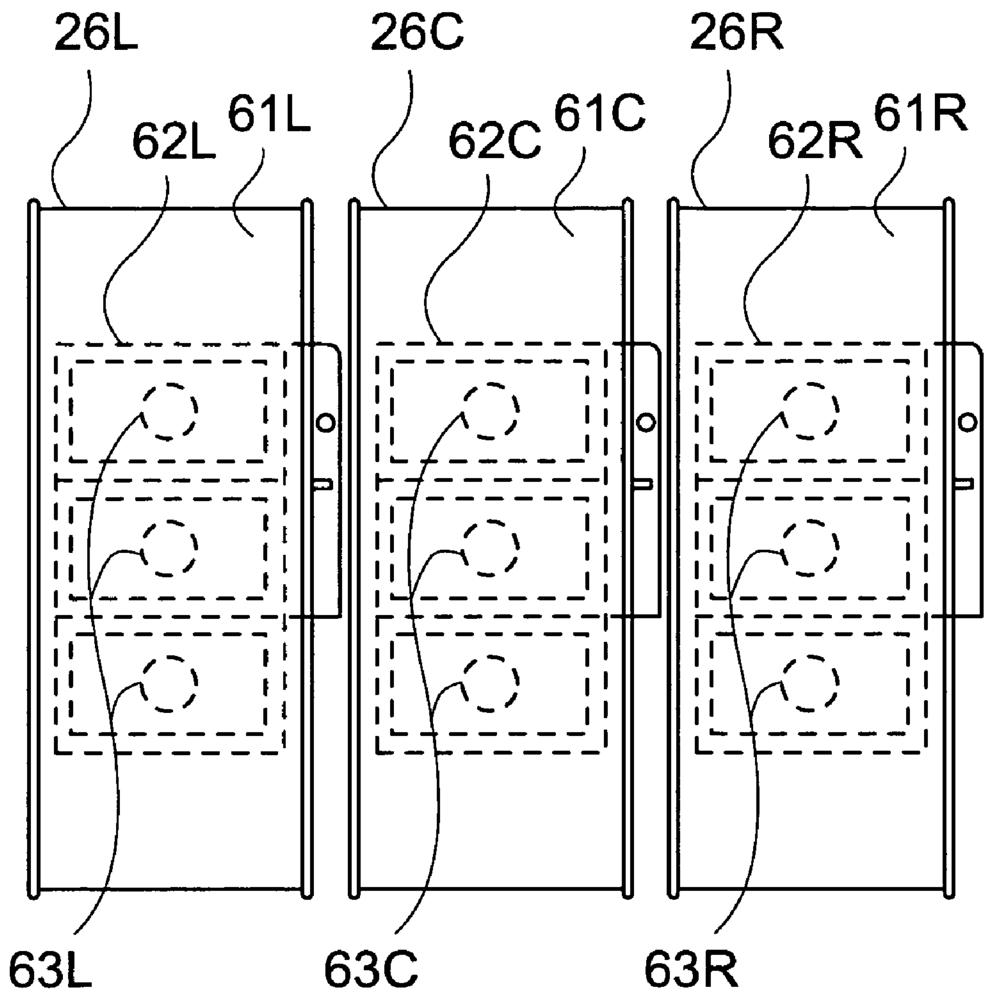
FIG. 7 illustrates the display device of the slot machine according to the embodiment of the present invention.

Near the front faces of the reels 26, lamp housings 62 (62L, 62C, and 62R) having reel back lamps 63 (63L, 63C, and 63R) mounted thereon are provided (see FIG. 7).

[Structure of Reel Back Lamps]

The reel back lamps 63 will be described with reference to FIG. 7, which is an enlarged view of the reels 26L, 26C and 26R.

The reels 26L, 26C, and 26R have reel bands 61L, 61C, and 61R made of a semi-transparent film material, on which symbols such as "cherry" and "7" are printed in light transparent color inks while the remaining regions being masked with optically shielding ink.

The lamp housings 62L, 62C, and 62R are disposed behind the reel bands 61L, 61C and 61R, respectively, so that light from each lamp may only illuminate respective symbol regions of the corresponding reel, but not the others. The reel back lamps 63L, 63C, and 63R are disposed inside compartments of the respective lamp housings 62L, 62C, and 62R.

The lamp control circuit 300 controls the reel back lamps 63L, 63C, and 63R so that they may flash on the basis of the parameters determined by a sub-microcomputer 210.

During the medal payout, for example, various flashing control modes may be prepared for each internal winning combination such that the reel back lamps 63L, 63C, and 63R may blink the symbols along the pay-lines in respective ways so as to suggest which winning combination the player should aim at.

The reel back lamps 63L, 63C, and 63R are usually kept lit so as to keep the symbols easily visible. When the power is turned on or when the gaming machine is reset, the reel back lamps are activated and turned on.

As described above, the display effect on the symbols may be made by turning off the lamps. In this embodiment, the display effect is made on the symbols. However, the present invention should not be limited thereto. The display effect on the symbols may not be made. In this case, when the power is ON or when the gaming machine is reset, the ON/OFF state is made to the ON state by activating the reel back lamps 63L, 63C, and 63R, and by keeping them ON all the time.

In this embodiment, the display effect on the symbols may be made by the turning-off operation. However, the present invention should not be limited thereto. The display effect may be made with various colored lights. In this case, when the power is ON time or when the gaming machine is reset, the ON/OFF state is turned to the ON state by activating the reel back lamps 63L, 63C, and 63R, and by keeping them ON all the time.

The reel illumination means such as the reel back lamps may illuminate the aforementioned reels when the power is turned ON. On the basis of the operation of the power ON, the function to illuminate the reels is activated to make the reels easily visible. Therefore, it is possible to maintain the interest of the player for a long time. If it is made easier for the player to recognize the symbols, the player may be less tired so as to keep the player having the interest on the game for a long time.

The reel illumination means may have a function to illuminate the reels all the time when the power is ON. When the gaming machine is turned on, i.e., when the game is to be played, the reels may be made easily visible to maintain the interest of the player for a long time. If it is easier for the player to recognize the symbols, the player may hardly get tired and can keep his interest on the game for a long time.

When the display effect is made, the reel illumination means may be turned OFF. When the display effect is not made, the reels are illuminated. In other words, the reels can be made easily visible by the illumination means. Even when the reels are not illuminated by the illumination means, there is a way to make the reels visible with or without the display effect.

The slot machine is configured to include the display device for displaying images being disposed in front of the reels, and the display control means for causing the display device to display images relating to the game. The display control means functions to cause the display device to display rather highly transparent images and enables the display device to show rather highly transparent image so-called at non-normal time so that the reels may be made more easily visible. Here, the highly transparent image may include an easily visible image in relation to the symbols (or images) drawn on the outer faces of the reels. When a green symbol is drawn on the reel, for example, it can be recognized more easily with a red image displayed on the display device than with an image in the same green color. Thus, the highly transparent image may include a suitable combination of light wavelength and phase.

Especially when the symbols are displayed varyingly by rotating the reels, it is harder for the player to recognize the moving symbols than symbols staying still. It may be possible to maintain the interest of the player for a long time if the reels are more easily visible to the player so that images on the display device become more easily recognizable. If the symbols in the motion are recognized with ease, the player would not be tired and keep his interest on the game. Since the game contents are often determined by a stopping state of the reel, the player may keep his interest for longer if the gaming machine is provided which is characterized in that it is easier for the player to recognize the transition from the moving state to the stopping state.

Here, the aforementioned case where the power is ON may include a case where the power is turned ON from the beginning, and a case where the power is turned back ON again shortly after the power is turned OFF. For example, the case may include a case where the power is turned ON again with a power button operation, and a case where the power is turned ON again with a reset button operation.

[Configuration of Control Unit of Gaming Machine]

Figure 8:
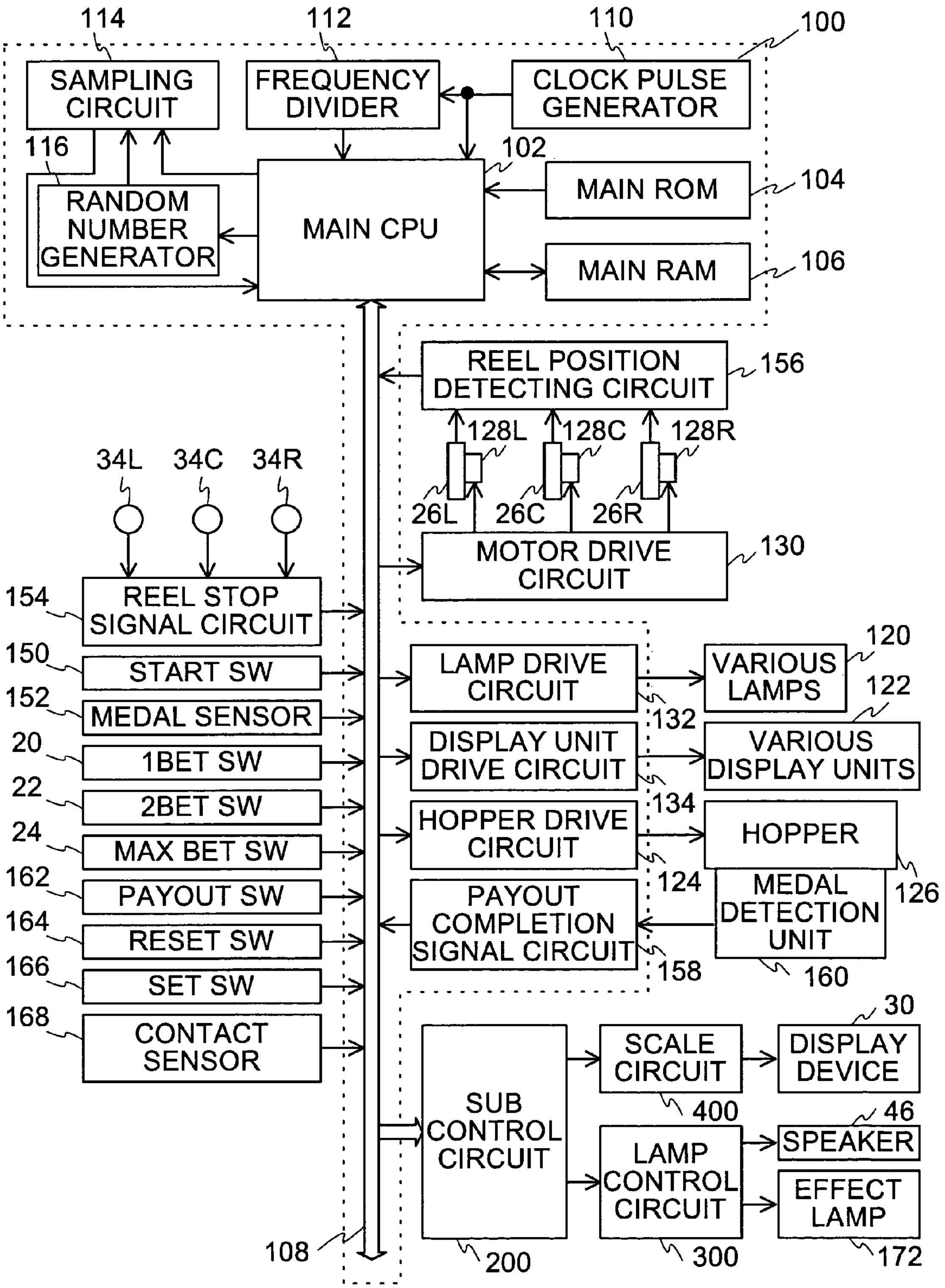
FIG. 8 is a block diagram of a circuit construction of the slot machine according to the embodiment of the present invention.

FIG. 8 shows a circuit configuration including the main control circuit 100 for controlling a gaming operation with the slot machine 10; peripheral devices connected electrically with the main control circuit 100; and a sub control circuit 200 for controlling the display device 30, speakers 46 and effect lamps 172 based on a control instruction transmitted from the main control circuit 100; a lamp control circuit 300; and a scale circuit 400.

The main control circuit 100 is provided with a circuit board having the main CPU 102, a main ROM 104, a main RAM 106, an input/output bus 108, a clock pulse generator 110, a frequency divider 112, a sampling circuit 114, and the random number generator 116.

The main CPU 102 can control the various peripheral devices with a program stored in the main ROM 104 using the data signal or address signal input/output via the input/output bus 108. And the main CPU 102 is provided with a timer (not shown).

The main ROM 104 is connected with the main CPU 102. The main ROM 104 stores various programs such as a control program for controlling the entire flow of the game with the slot machine 10 and an initial data for executing the control program.

For example, the main ROM 104 stores a probability lottery table to be used for determining the random number sampling at every time when the start lever 32 is operated (for the start operation); a stop control table for determining the stop mode of the reels in response to the operation of the stop buttons; a winning symbol combination table corresponding to a symbol displayed in a stopping state in accordance with the stop control table so as to determine the number of game medals to be paid out; and various control instructions (or commands) to be transmitted to the sub control circuit 200. Here, the details of the probability lottery table, stop control table, and winning symbol combination table will be described later.

The various control instructions may include "demonstration display command," "start command," "all reel stop command," and "winning combination command". Here, the sub control circuit 200 does not input any commands to the main control circuit 100, but the communications between them are one way from the main control circuit 100 to the sub control circuit 200. The main control circuit 100 and the sub control circuit 200 are connected through sixteen data signal lines and one signal line. And, these commands are composed of 2 bytes, 4 bytes, and six bytes, and one command is sent in 1, 2, or 3 sequences through the sixteen data signal lines.

The main RAM 106 is connected with the main CPU 102 and stores values of flags or variables to be used in the aforementioned programs.

The clock pulse generator 110 for generating reference clock pulses, the frequency divider 112, the random number generator 116 for generating a random number to be sampled, and the sampling circuit 114 are connected with the main CPU 102.

The random number generator 116 generates random numbers in a predetermined numerical range and the sampling circuit 114 samples one random number at a suitable timing after the start lever 32 is operated.

The internal winning combination is determined based on a random number thus sampled and the probability lottery table stored in the main ROM 104. After the internal winning combination is determined, the random number sampling is done to select the "stop control table" and the "stop table" contained in the former.

Here, the random number generator 116 generates the random numbers contained within the numerical values of a predetermined range, such as 0 to 65535 (i.e., 2 to the 16th power). It should be noted that the present invention not be limited to the random number generated by the random number generator 116. The random number may be sampled with a program operation by the main CPU 102. In this event, the random number generator 116 and the sampling circuit 114 may be omitted. But they can be left as the backup of the random number sampling operation.

Main input signal generating means for generating an input signal necessary for the main CPU 102 to generate a control signal may include a start switch 150, the 1-BET switch 20, the 2-BET switch 22, the MAX-BET switch 24, the deposited-medal adjusting button 36, a medal sensor 152, a reel stop signal circuit 154, a reel position detecting circuit 156, a payout completion signal circuit 158, a payout switch 162, the reset switch 164, the setting switch 166, and a contact sensor 168. These elements are also connected with the main CPU 102 through the input/output bus 108.

The reel stop signal circuit 154 detects the operation of each of the stop buttons 34L, 34C, and 34R and supplies the main CPU 102 with the stop signal through the input/output bus 108 when it makes the detection.

The start switch 150 detects the operation of the start lever 32 and supplies the main CPU 102 with the start signal through the input/output bus 108 when it detects the operation of the start lever 32.

The medal sensor 152 detects a game medal inserted into the medal insertion slot 31 and supplies the main CPU 102 with the medal insertion signal through the input/output bus 108 when it detects a game medal inserted into the medal insertion slot 31.

The 1-BET switch 20 detects its own operation and supplies the main CPU 102 with the 1-BET signal through the input/output bus 108 when the 1-BET switch 20 detects its own operation.

The 2-BET switch 22 detects its own operation and supplies the main CPU 102 with the 2-BET signal through the input/output bus 108 when the 2-BET switch 22 detects its own operation.

The MAX-BET switch 24 detects its own operation and supplies the main CPU 102 with the MAX-BET signal through the input/output bus 108 when the MAX-BET switch 24 detects its own operation.

The payout switch 162 detects the operation of the deposited-medal adjusting button 36 and supplies the main CPU 102 with the deposited-medal adjusting signal when it detects the operation of the deposited-medal adjusting button 36.

The reset switch 164 is disposed inside the slot machine 10, and supplies the main CPU 102 with the reset signal through the input/output bus 108 when it detects the operation of the slot machine 10.

The setting switch 166 detects the operation of the setting button (not shown) disposed inside the slot machine 10 and supplies the main CPU 102 with the setting signal through the input/output bus 108 when it detects the operation of the setting button.

The reel position detecting circuit 156 supplies the main CPU 102 through the input/output bus 108 with the reel position signal for detecting the position of each of the reels 26L, 26C, and 26R in response to the pulse signal from the reel rotation sensor.

The payout completion signal circuit 158 detects the game medal payout completion, when the counted value (i.e., the number of game medals paid out from the hopper 126) of a medal detection unit 160 reaches data of the designated number, and supplies the main CPU 102 with a payout completion signal indicating the detection through the input/output bus 108.

The major devices which are controlled in the operation by the control signal from the main control circuit 100 include various lamps 120; various display units 122; the hopper (including the drive unit for the payout) 126 for storing the game medals and for paying out a predetermined number of game medals in response to the instruction of a hopper drive circuit 124; and stepping motors 128L, 128C, and 128R for driving the reels 26L, 26C, and 26R rotatably. Here, the various lamps 120 include the symbol illuminating lamps 57.

A motor drive circuit 130 for controlling the drives of the stepping motors 128L, 128C, and 128R; the hopper drive circuit 124 for controlling the drive of the hopper 126; a lamp drive circuit 132 for controlling the various lamps; and a display unit drive circuit 134 for controlling the drives of the various display units are connected with the output unit of the main CPU 102 through the input/output bus 108. These drive circuits control the operation of each of the devices in response to each of the control signals such as the drive signal output from the main CPU 102.

The device which is controlled in operation with the control signal from the main control circuit 100 may include the sub control circuit 200.

The lamp control circuit 300, the scale circuit 400, the display device 30, the speakers 46 (46L and 46R), and the effect lamps 172 are connected with the sub control circuit 200.

The display device 30 receives the image signal provided by the sub control circuit 200 and the scale circuit 400 so as to display the image.

The speakers 46 receive the sound signal provided by the sub control circuit 200, and the lamp control circuit 300 so as to emit sound.

The effect lamps 172 receive the effect signal provided by the sub control circuit 200 and the lamp control circuit 300 so as to perform the effects. Here, these effect lamps 172 include the reel back lamps 63.

[Electric Construction of Sub Control Circuit]

Figure 9:
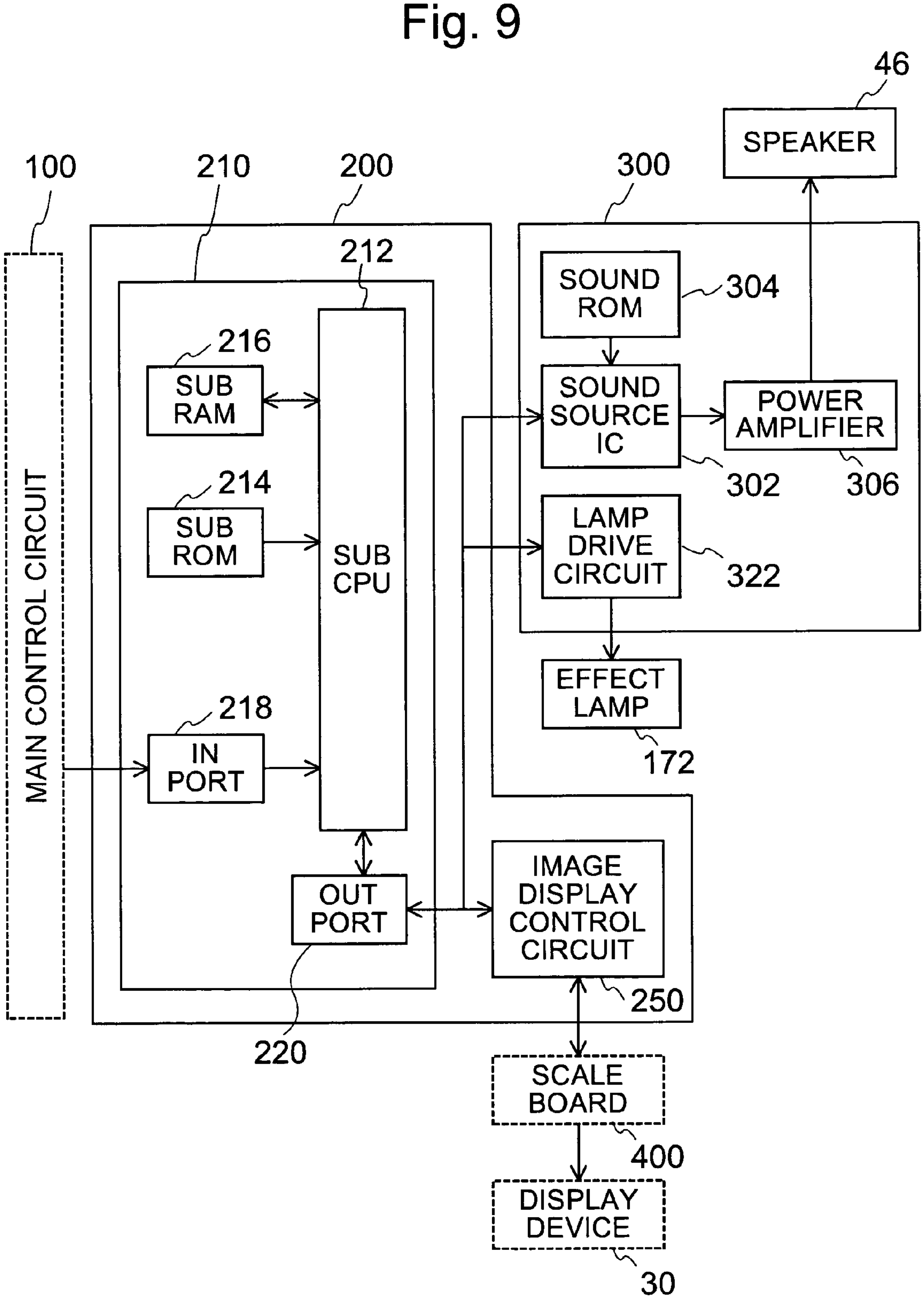
FIG. 9 is a block diagram of a circuit construction of the slot machine according to the embodiment of the present invention.
Figure 10:
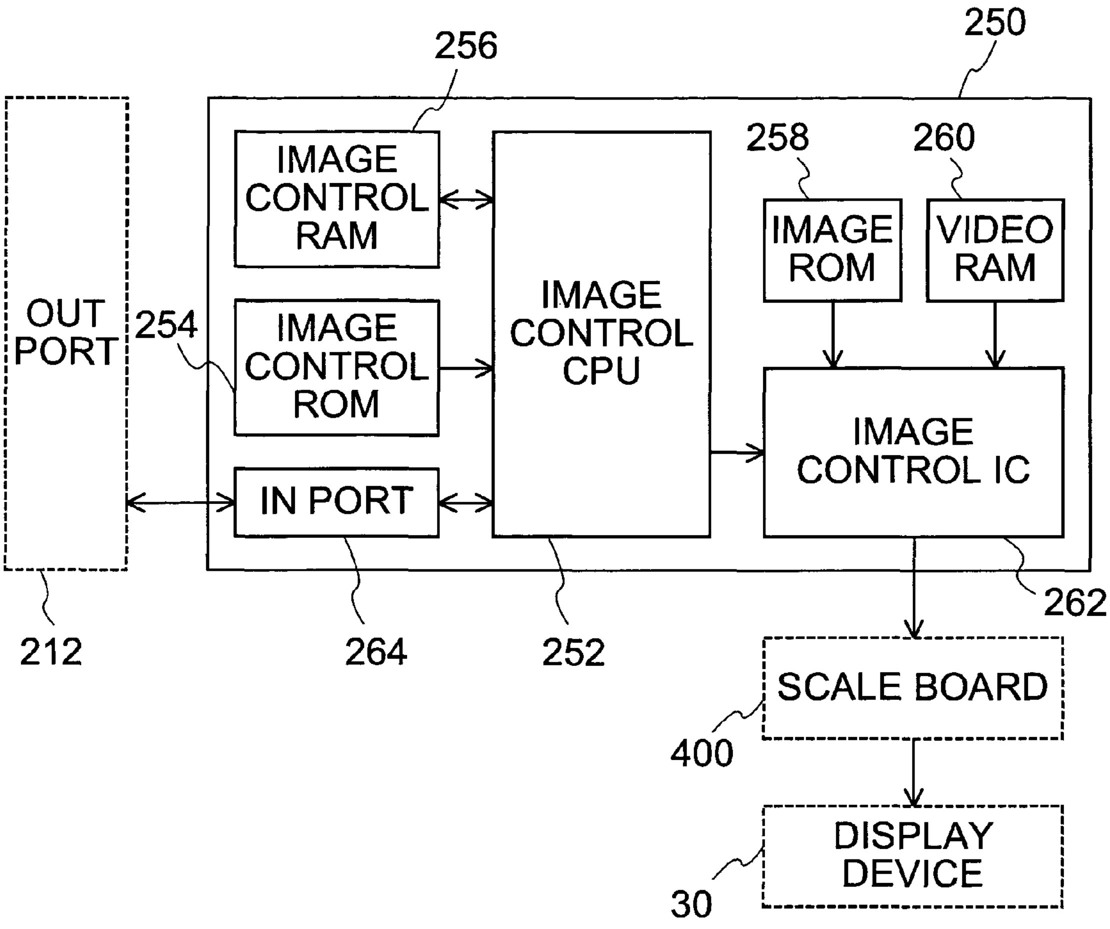
FIG. 10 is a block diagram of a circuit construction of the slot machine according to the embodiment of the present invention.

The sub control circuit 200 will be described referring to FIGS. 9 and 10. The block diagrams in FIGS. 9 and 10 show the configuration of the sub control circuit 200.

The sub control circuit 200 performs the display control of the display device 30, the output control of the sound emitted from the speakers 46, and the effect control of the effect lamps 172 automatically or based on the control instruction (or command) from the main control circuit 100.

The sub control circuit 200 is constructed on another circuit board than the circuit board constituting the main control circuit 100. The sub control circuit 200 includes the sub-microcomputer 210 as a major component thereof and an image control circuit 250 for controlling the display on the display device 30.

The sub-microcomputer 210 includes a sub-CPU 212 for performing the control operation in accordance with the control instruction transmitted from the main control circuit 100, a sub-ROM 214 storing the control program of the sub-microcomputer 210, a sub-RAM 216, an IN port 218, and an OUT port 220.

Although the sub control circuit 200 is not provided with the clock pulse generator, the frequency divider, the random number generator, or the sampling circuit, it is configured to execute the random number sampling over the operation program of the sub-CPU 212.

The sub-CPU 212 determines what effects are to be made by the various effect control circuits based on the game information command transmitted from the main control circuit 100, and transmits the determined contents to each of the effect control circuits.

The sub-ROM 214 stores the communication sequence program with the main control circuit 100, the effect selecting table for selecting the various effects on the basis of the received game information, the sound sequence program, and so on.

The sub-RAM 216 is used as a working area for executing those control programs.

The IN port 218 has functions to receive the game information of images or sound provided from the main control circuit 100 and to supply the game information to the sub-CPU 212.

Here, the IN port 218 only passes the game information from the main control circuit 100 to the sub-CPU 212, but does not pass any signal from the sub-CPU 212 to the main control circuit 100. Even if a malfunction occurs in the sub control circuit 200, the malfunction does not transmit to the main control circuit 100.

The OUT port 220 has functions to pass the image display signal to the image control circuit 250, a sound generation signal to a sound source IC 302 in the lamp control circuit 300, and an effect lamp signal to the lamp control circuit 300 so as to turn ON and OFF the effect lamps 172.

As shown in FIG. 10, the image control circuit 250 is composed of an image control CPU 252, an image control ROM 254, an image control RAM 256, an image ROM 258, a video RAM 260, an image control IC 262, and an IN port 264.

The image control CPU 252 receives parameters determined by the sub-microcomputer 210 through the IN port 264, and determines display contents shown on the display device 30 in accordance with the image control sequence program stored in the image control ROM 254.

The image control ROM 254 stores the reception sequence program of the image effect command transmitted from the sub-microcomputer 210, and the image control sequence program for controlling the image control IC 262.

The image control RAM 256 is used as a working area when the image control program is executed.

The image control IC 262 forms the image according to the display contents determined by the image control CPU 252 using the graphic data stored in the image ROM 258, stores the image temporarily in the video RAM 260, and supplies the image at a suitable timing to the scale circuit 400 through the image control IC 262.

[Electric Configuration of Lamp Control Circuit]

The lamp control circuit 300 will be described with reference to FIG. 9.

The lamp control circuit 300 is composed of the sound source IC 302 for controlling the sounds emitted from the speakers 46; a sound ROM 304 stored with the sound data; a power amplifier 306 acting as an amplifier; and a lamp drive circuit 322 for driving the effect lamps 172.

[Electric Configuration of Scale Circuit]

The scale circuit 400 will be described with reference to FIG. 11.

The scale circuit 400 is composed of a signal conversion CPU 272, a signal conversion ROM 274, a video RAM 276, an IN port 278 and an OUT port 280.

In accordance with the signal conversion sequence program stored in the signal conversion ROM 274, the signal conversion CPU 272 receives an image signal generated by the image control circuit 250 through the IN port 278, converts the image signal in the display format so that the image according to the image signal can be properly displayed on the display device 30, and store the converted image signal (image data) in the video RAM 276.

The signal conversion CPU 272 supplies the image data stored in the video RAM 276 as an enlarged image signal suitable for the display device 30 to the display device 30 through the OUT port 280.

Specifically, the signal conversion CPU 272 converts the image signals such as VGA into the enlarged image signals such as XGA, which can apply to the large display size.

In this embodiment, the image data of the display size VGA are enlarged by bit and converted into the display size of XGA. However, the present invention should not be limited thereto. The image data of the VGA size may be received and synthesized into the image data of the display size of XGA.

Here, in this embodiment, the conversion is made as the enlarged image signals of XGA: 1,024 bits (width) and 768 bits (height), and 8 bits of red data, green data, and blue data. In the present invention, however, the enlarged image signals may display an image of a larger size, and the conversion type, the width and height bit sizes, and the gradation bits of the individual colors should not be limited to the aforementioned values.

The signal conversion CPU 272 is designed to receive the image signals provided from the sub control circuit 200 at a predetermined cycle. When the normal image signals are not received at the predetermined cycle, image data are stored in the video RAM 276 so that the predetermined image is displayed.

Therefore, the signal conversion CPU 272 monitors whether the image signal provided from the sub control circuit 200 is normal or not. If it is determined that the image signal is not normal (i.e., abnormal) based on the monitored results, a predetermined image is displayed so that the normal image state is kept with the display device 30. If the synchronized signal is absent or out of a specification while the input synchronized signal is monitored, the display device 30 is subject to the transparency control (so-called "white output").

The signal conversion CPU 272 is configured to display the predetermined image as described hereinbefore. The image data are stored in the video RAM 276 so that the predetermined image may be so transparent as to allow the player to view the reels 26L, 26C and 26R through the image.

The signal conversion ROM 274 stores a communication sequence program for communicating with the image control circuit 250; a sequence program for converting the received image signals into the enlarged image signals; and a communication sequence program for feeding the enlarged image signals converted, to the display device 30 through the OUT port 280.

The IN port 278 has a function to receive the image signals provided from the image control circuit 250 and to supply the image signals to the signal conversion CPU 272. The OUT port 280 performs image display effects by providing the enlarged image signal converted into the image signal conversion circuit 270 to the display device 30.

Here, in this embodiment, the LVDS (Low Voltage Differential Signaling) is adopted for the image signal to be provided to the image signal conversion circuit 270. The present invention should not be limited thereto. But there may be various types. Preferably, by using the differential type such as the LVDS, for example, the image signal is hardly subject to the influence of noise so that the image is displayed without deterioration.

In this embodiment, the image signal to be provided to the image signal conversion circuit 270 is of the VGA (Video Graphics Array) size so that they are converted into the enlarged image signal of the XGA (eXtended Graphics Array) size by the operation of the image signal conversion circuit 270. Here in this embodiment, the image signal of the VGA size is provided to the image signal conversion circuit 270. However, the present invention should not be limited thereto. But image signals of various sizes may be provided.

[Board Construction of Display Device]

The electric construction in the display device 30 will be described with reference to FIG. 11.

Figure 11:
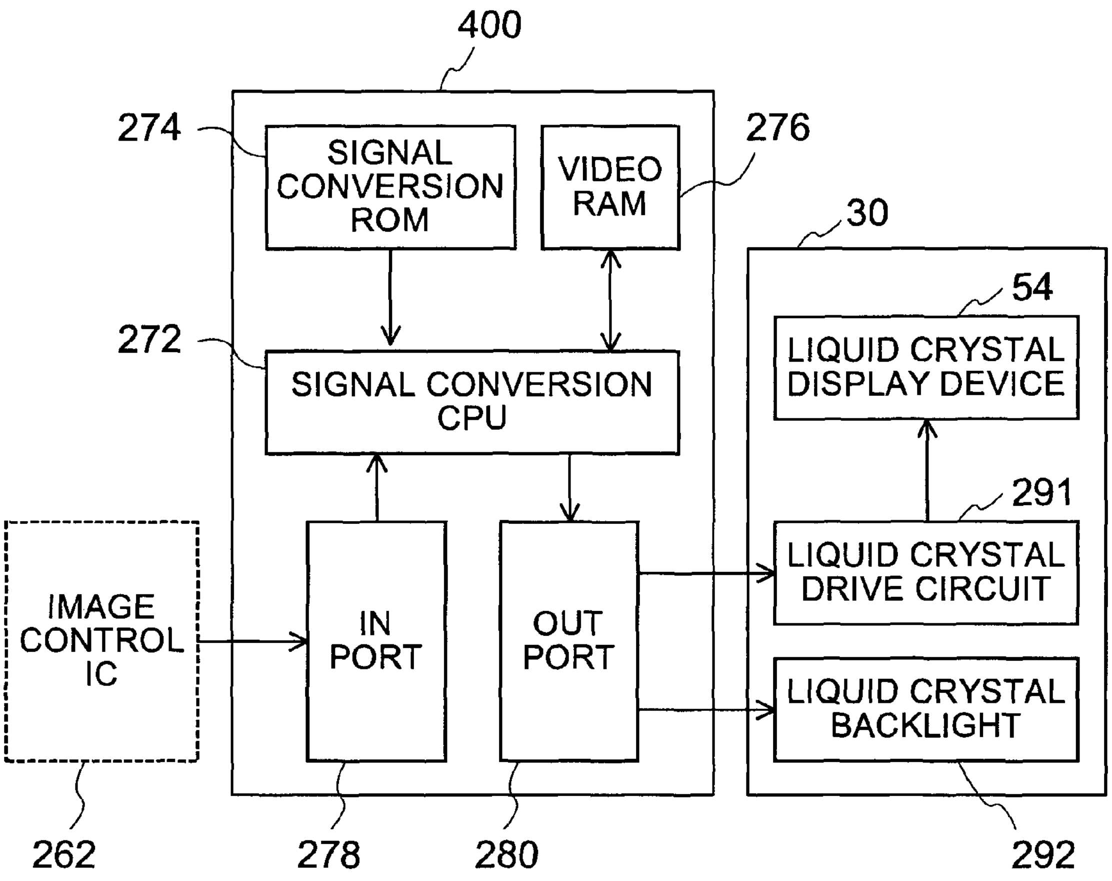
FIG. 11 is a block diagram of a circuit construction of the slot machine according to the embodiment of the present invention.

As shown in FIG. 11, the display device 30 is constructed to include a liquid crystal display device 54, a liquid crystal drive circuit 291 and liquid crystal backlights 292.

The liquid crystal display device 54 displays the various images on the basis of the image signal provided from the aforementioned scale circuit 400.

The liquid crystal drive circuit 291 receives the image signal provided from the aforementioned scale circuit 400, and displays the image on the liquid crystal display device 54 on the basis of the image signal.

The liquid crystal backlights 292 display the liquid crystal clearly by illuminating the liquid crystal display device 54 from the back.

[Power Supply Configuration Using Power Source Relay Board]

The electric configuration of the power source to be provided from the power source device 79 is described with reference to FIG. 12.

Figure 12:
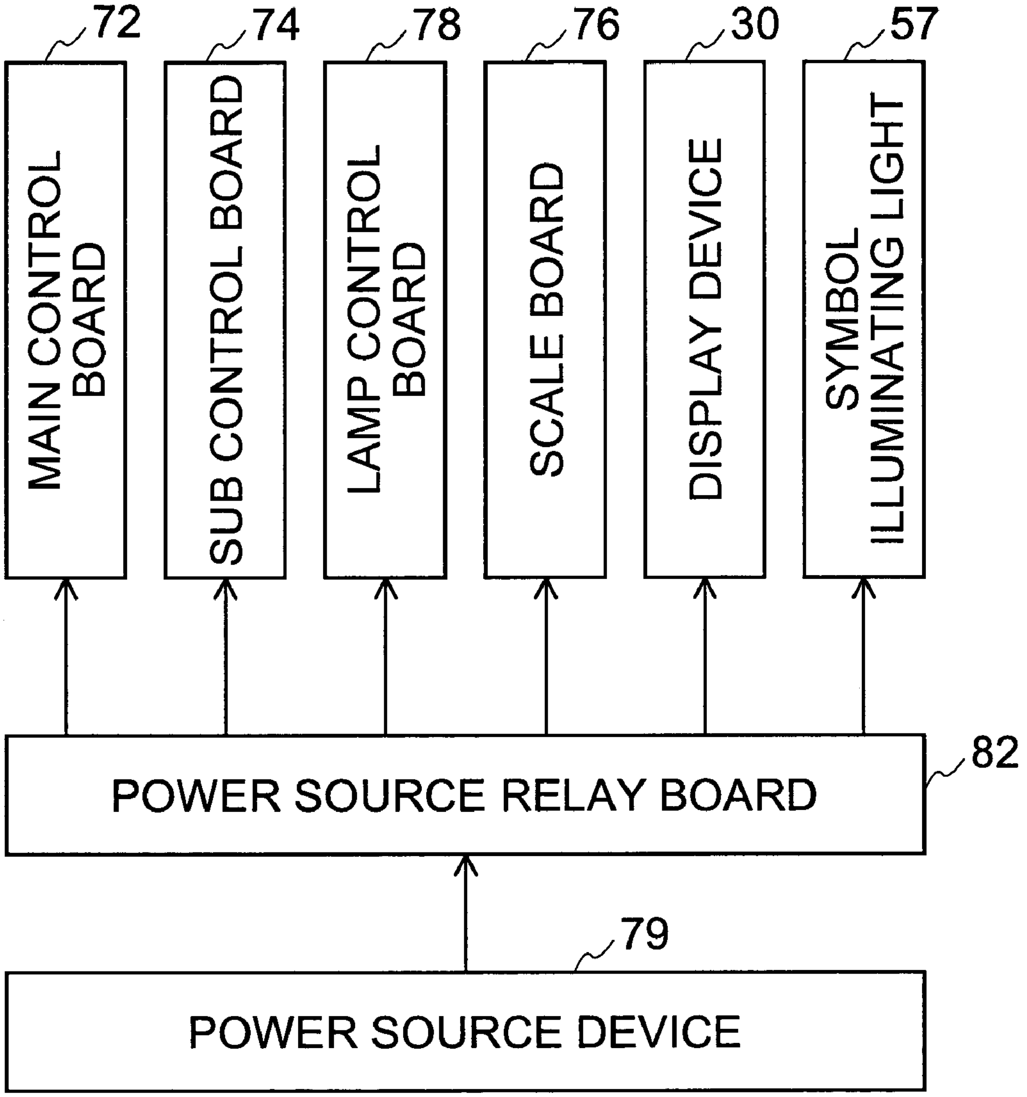
FIG. 12 is a block diagram of a circuit construction of the slot machine according to the embodiment of the present invention.

As shown in FIG. 12, the power of the power source device 79 is provided to the power source relay board 82 and then to the connection cable (not shown) for the power source supply, the main control board 72, the sub-control board 74, the lamp control board 78, the scale board 76, the display device 30, and the symbol illuminating lamps 57.

As described hereinbefore, there may be provided: the display device having the display control means; the image state control unit having the image state control means for receiving the image signal and for controlling the image-displaying display device in a predetermined state if the image signal provided from the display control means is abnormal; and the power source supply means for providing the image state control unit and the display device independently with power. Even if the power is not provided to the display device, the power is independently provided from the power source supply means to the image state control unit so that the state of the image can be kept without displaying any disturbed images.

There are provided the display device having the display control means, and the power source supply means for providing the power independently from the display device. Even if the power is not provided to the display device, the power is provided independently from the power source supply means for the display device.

The image signal control unit is configured to include the image signal control means, the transparent image display means, and the image enlarging conversion means for converting the received image signal into the enlarged image signal. Therefore, an uncomfortable image, which might be caused by various troubles, can be kept from the display device so that the display device is kept in the predetermined state. By eliminating one factor which may give an uncomfortable feel during playing the game, the interest of the player can be maintained for a long time.

A large sized image may be displayed since the image signal of the displayed image is enlarged and converted so as to form a larger image than usual. A game having dynamic effects with a large image would be able to be provided, but a larger image tends to give the player more influences of the uncomfortable image content. Especially if the image thus enlarged and converted is displayed, it may give a relatively serious uncomfortable feeling of the uncomfortable image to the player. By eliminating one cause for the uncomfortable feeling during the play, it is possible to provide the game maintaining the interest of the player for a longer time.

By providing the image state control means and the image enlarging conversion means in a common image signal monitoring unit, it is possible to avoid size enlargement to save space as well as to reduce noise influences.

Further, since the image state control unit is provided with the image state control means as well as the image enlarging conversion means for converting the image signal received into the enlarged image signal, the power may be provided independently from the power source supply means so that the state of the image can be kept in the predetermined state without displaying any disturbed images even if the power is not provided to the display control unit. By eliminating one cause for an uncomfortable feeling during the game play, it is possible to provide the game capable of maintaining the interest of the player for a long time.

There may be provided power source relay means, which relays the power provided from the power source supply means, for branching the power provided from the power source supply means to the image state control unit and the display device. Therefore, the number of cables to be wired from the power source supply means can be reduced, and many cables need not be bundled in the manufacturing process. At the reusing and recycling steps, the many cables need not be unbundled so that their manufacturing process can be simple and convenient.

For example, a gaming machine is generally composed of a main body having a recess; a door for covering the recess; and a device (including a board) disposed in the recess. The aforementioned power source supply means is generally disposed in the recess of the main body. On the other hand, devices to be provided with the power from various power sources are disposed in the recess of the main body and on the door. Therefore, unlike the device disposed in the main body, the device disposed in the door is positioned rather far from the power source supply means such that it needs troublesome works to wire the many power source cables for supplying the power from the power source supply means to the device and the power source cables may be pinched and disconnected while the door is opened and closed.

By providing the power source relay means, the power source cables to the power source relay means can be reduced to make the works easier in the manufacturing process.

Especially by providing the door with the power source relay unit having that power source relay means, the wiring works can be made efficient. In the multi-function gaming machine in recent years, many devices are disposed on the door. Therefore, the number of power source cables for feeding the power source to those devices can be reduced and efficiently wired.

[Operations of Gaming Machine]

Figure 13:
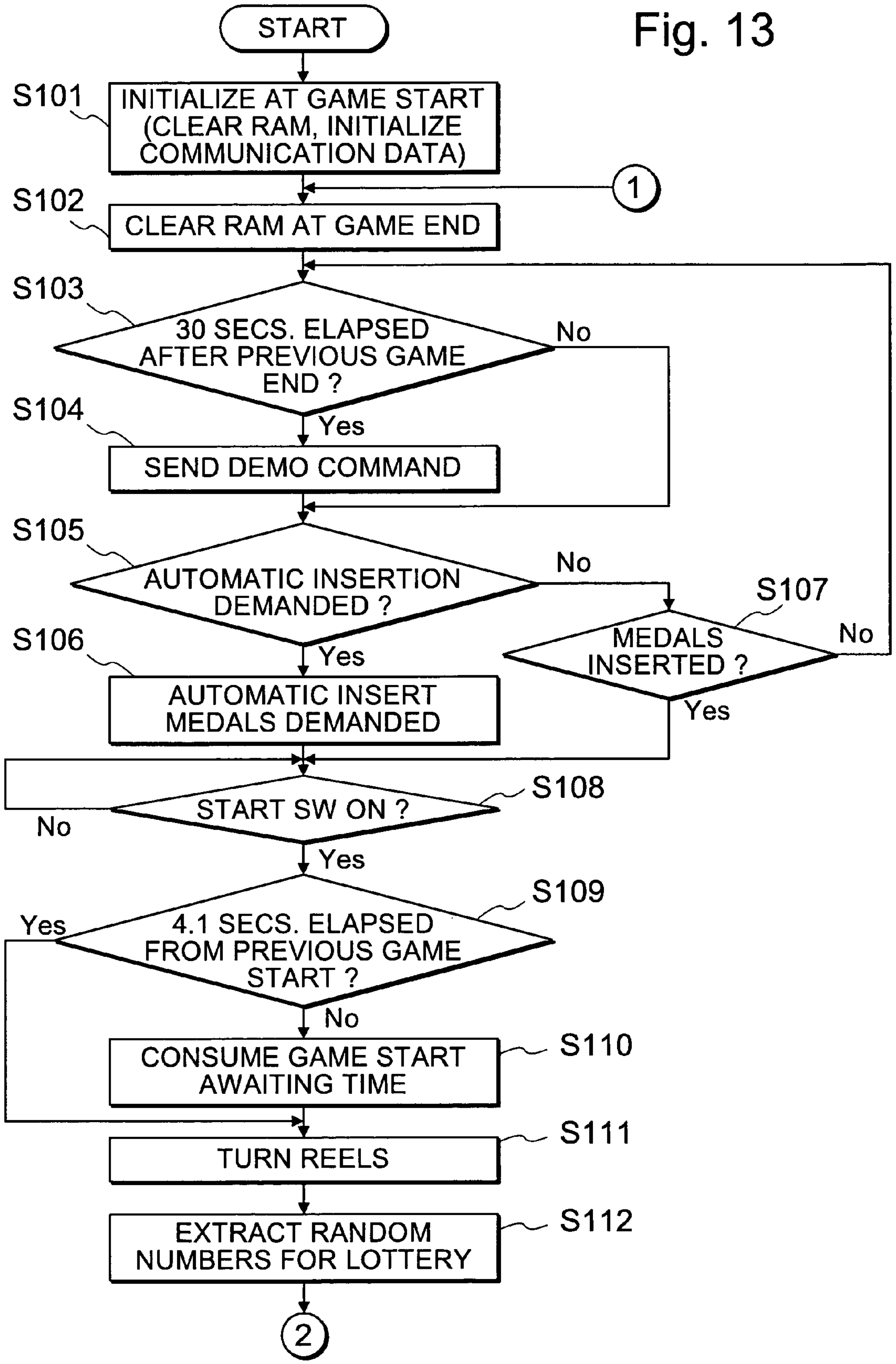
FIG. 13 is a flow chart of a control process to be executed in the slot machine according to the embodiment of the present invention.
Figure 14:
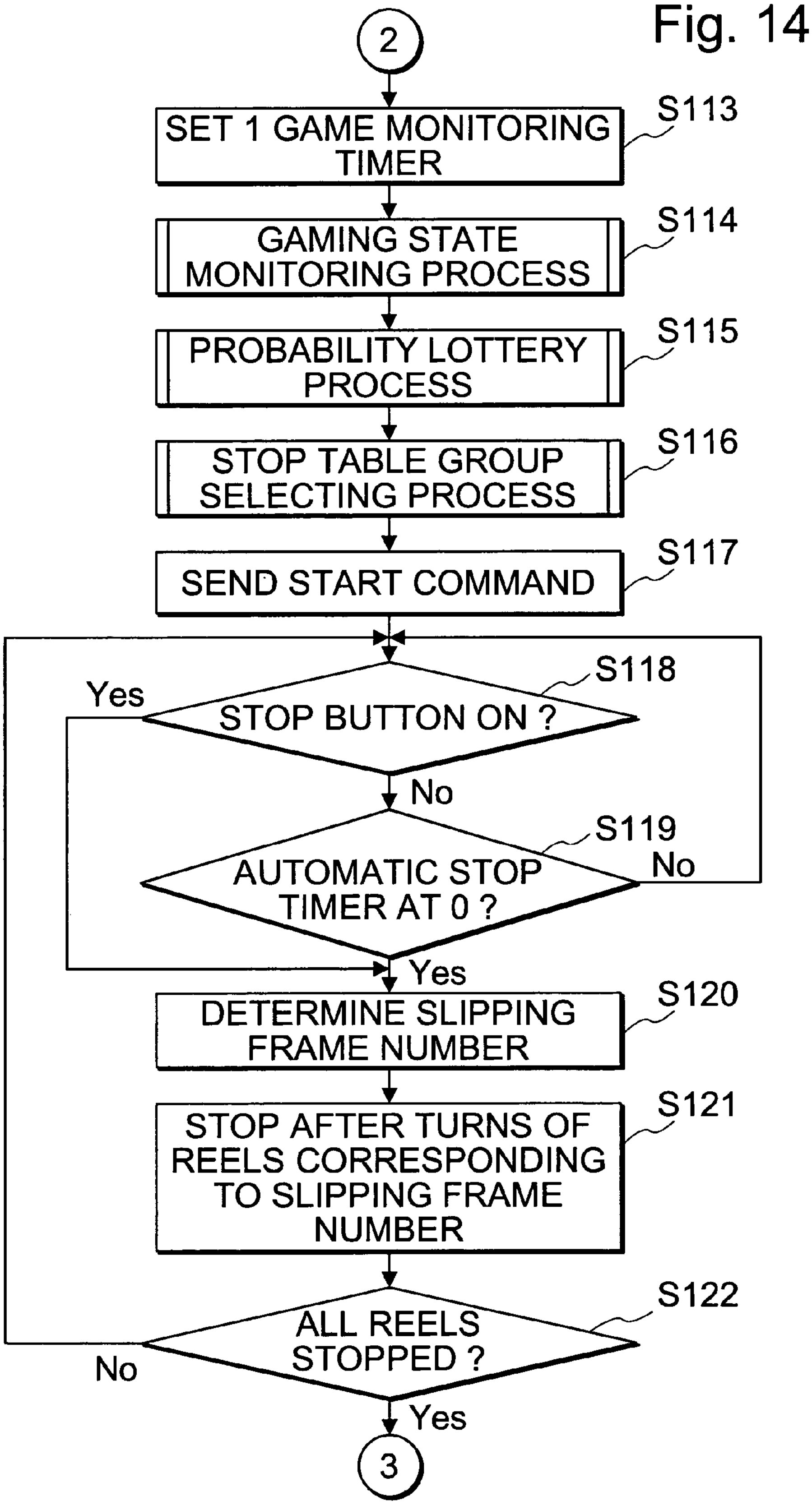
FIG. 14 is a flow chart of a control process to be executed in the slot machine according to the embodiment of the present invention.
Figure 15:
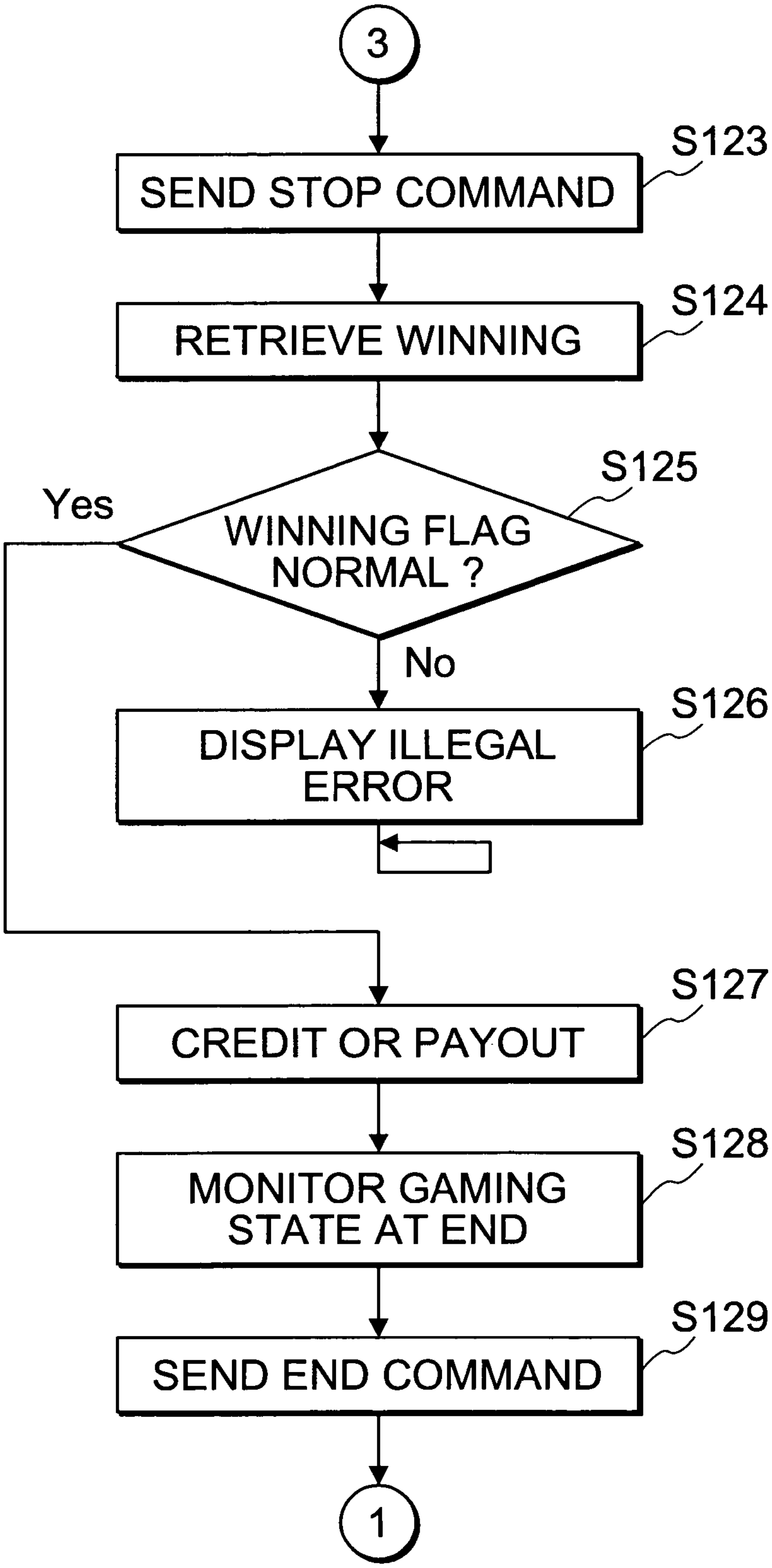
FIG. 15 is a flow chart of a control process to be executed in the slot machine according to the embodiment of the present invention.
Figure 16:
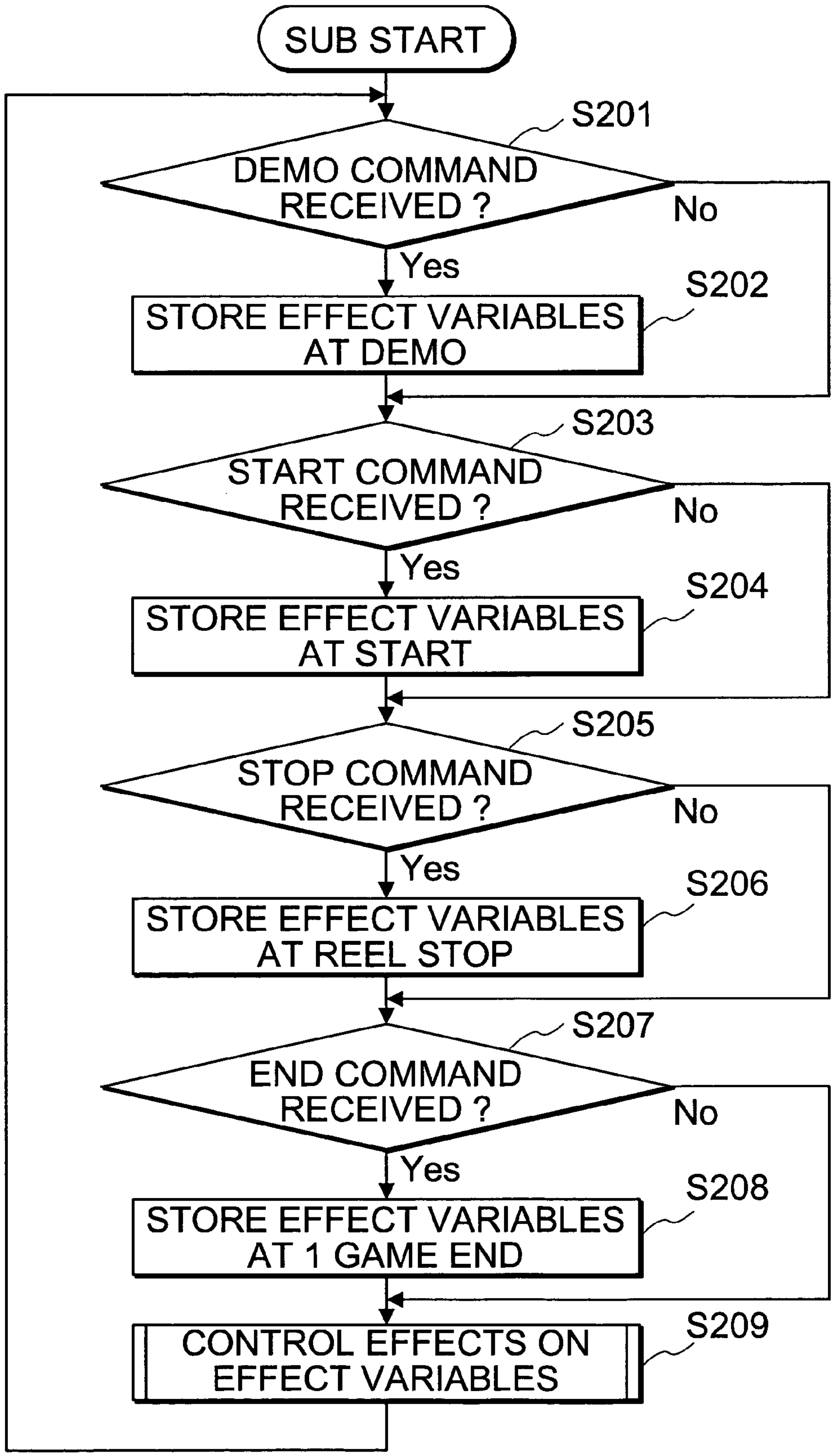
FIG. 16 is a flow chart of a control process to be executed in the slot machine according to the embodiment of the present invention.
Figure 17:
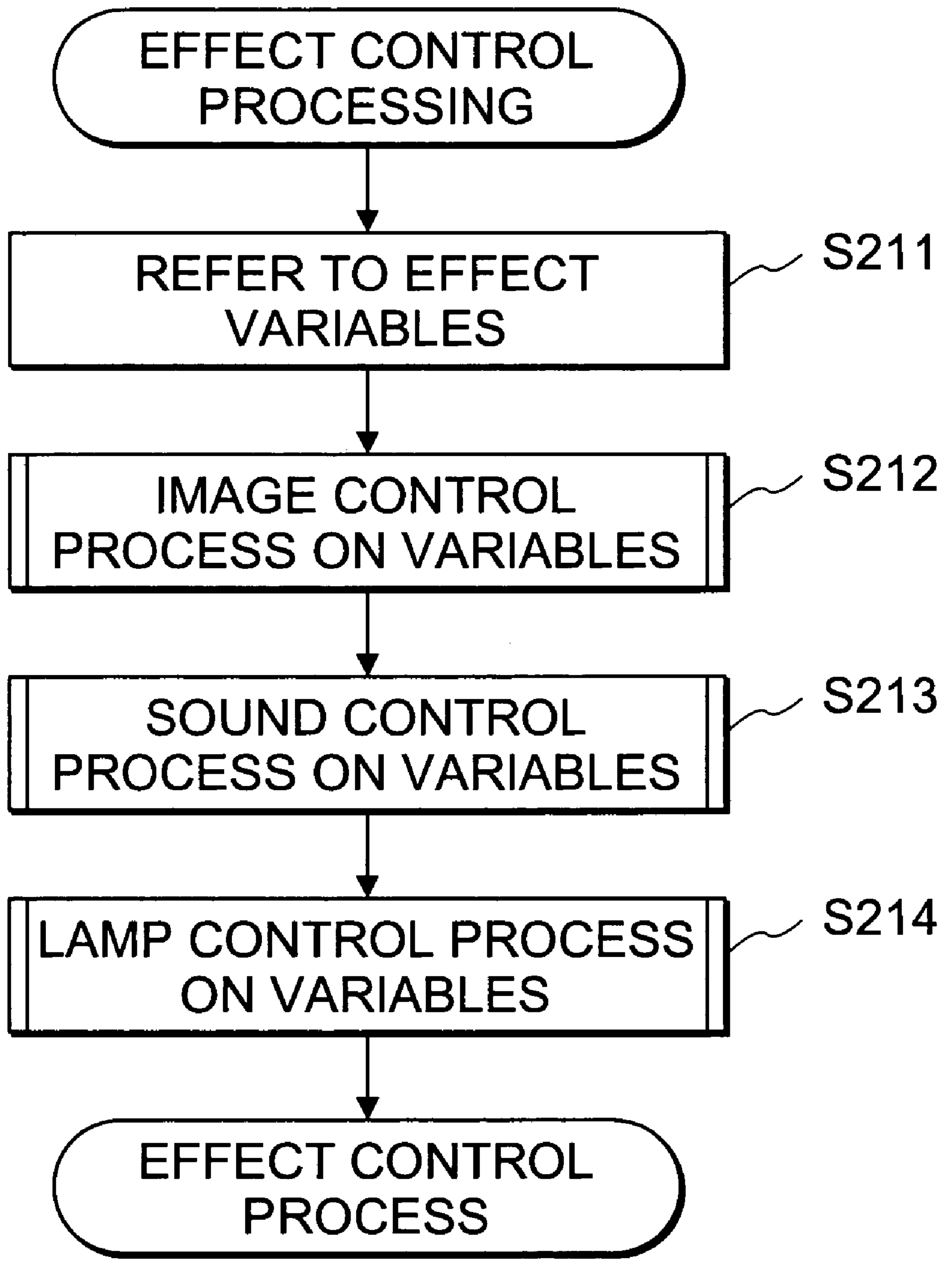
FIG. 17 is a flow chart of a control process to be executed in the slot machine according to the present invention.
Figure 18:
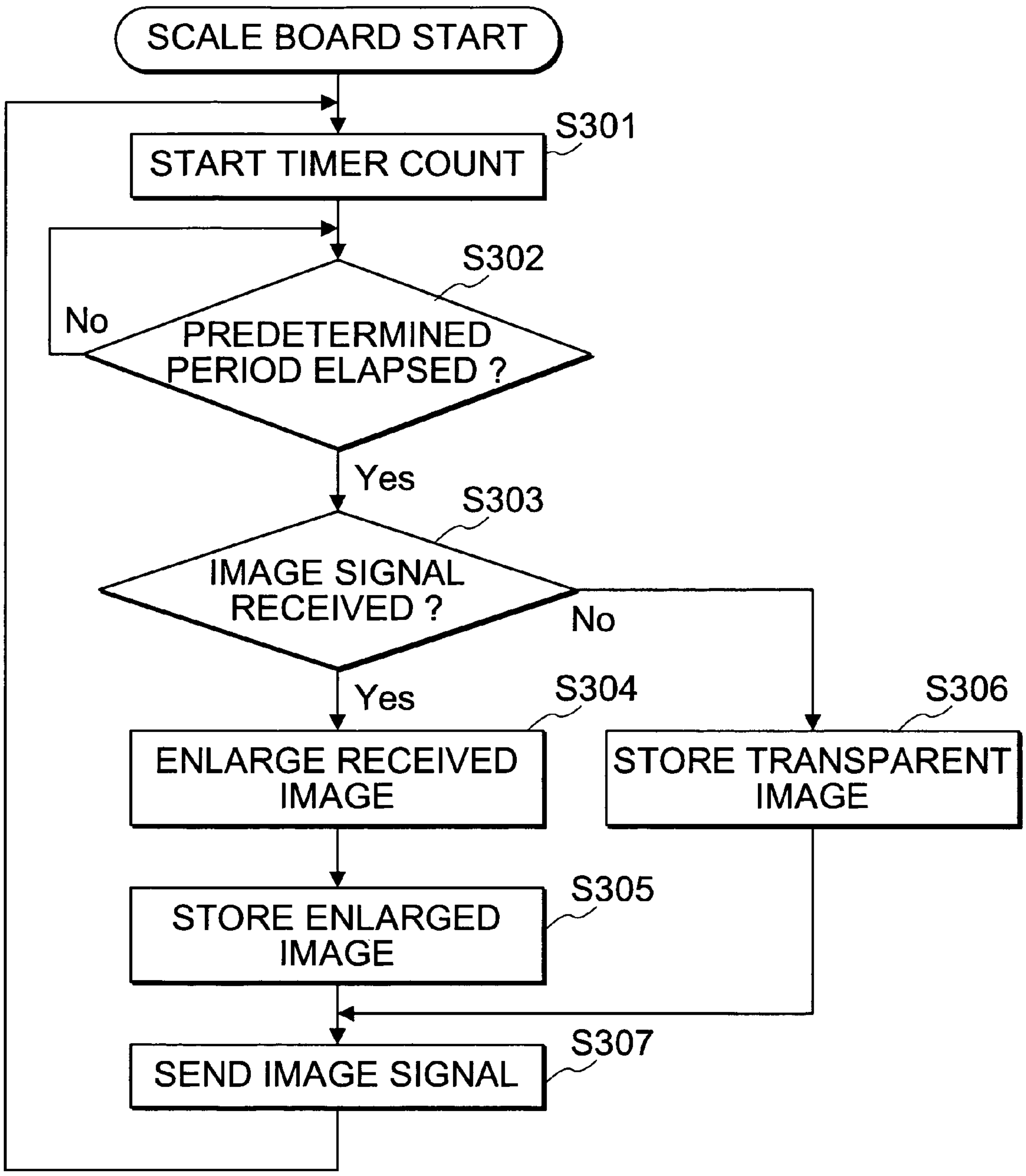
FIG. 18 is a flow chart of a control process to be executed in the slot machine according to the present invention.

Subroutines to be executed in various circuits such as the aforementioned main control circuit 100 and the sub control circuit 200 so as to control the slot machine 10 are shown in FIGS. 13 to 18. Here, the subroutines, as shown in FIGS. 13, 16 and 18, are called and executed at a predetermined timing from the main program having been executed in advance.

In the following, it is assumed that the slot machine 10 is turned on in advance, that the variables to be used in the aforementioned main CPU 102, sub-CPU 212, the image control CPU 252, and the signal conversion CPU 272 are initialized to be predetermined values, respectively, and that the slot machine 10 is steadily operating.

[Operations of Main Control Circuit]

First of all, an initialization is executed (at Step S101) in the slot machine 10, as shown in FIG. 13. Specifically, the main CPU 102 initializes the stored contents in the main RAM 106, the communication data and so on. The initialization of the stored contents of the main RAM 106 is done by turning ON the slot machine 10 so as to clear an indefinite value stored in the main RAM 106.

Here, the main CPU 102 can also leave the whole or a part of area of the main RAM 106 not being initialized. As a result, the amusement of the game can be raised by changing the situations of the games at the slot machine 10 randomly when the power source is turned ON.

Effective signals are sent to the reel back lamps 63 so as to turn ON the back lamps 63 normally. After completion of this process, it proceeds to Step S102.

Next, an erasing process of the stored contents at the game end is executed (at Step S102). In this process, the main CPU 102 erases the data in a writable region, as used in the previous game, of the main RAM 106, stores parameters necessary for the next game in the writable region of the main RAM 106, and stores a starting address of the sequence program to be used in the next game. After this process, it proceeds to Step S103.

Next, it is determined (at Step S103) whether or not 30 seconds have elapsed after the end of the previous game. In this process, the main CPU 102 determines whether or not the counted value, as started from the end of the previous game, of a timer packaged in the main CPU 102 is a predetermined time period, e.g., 30 seconds or longer in this embodiment. The main CPU 102 shifts the process to Step S104, if it determines that the counted value of the timer is 30 seconds or longer. But it shifts the process to Step S105, if it determines that the counted value of the timer is not 30 seconds or longer.

Next, a demo command is sent (Step S104). In this process, the main CPU 102 transmits a display instruction to display the demo screen to the sub control circuit 200 through the input/output bus 108. In response to this instruction, the sub-CPU 212 in the sub control circuit 200 displays the demo screen on the display device 30 through the image control circuit 250, as will be described later. It proceeds to Step S105, after the end of this process.

Next, it determines whether or not an automatic insertion is demanded (Step S105). In this process, the main CPU 102 determines whether or not the general gaming state was in the previous game and whether or not a replay combination was won. The main CPU 102 reads out the data indicating the winning state in the previous game, as positioned in the main RAM 106. If it is discriminated that the read data indicate that the replay combination was won, the process shifts to Step S106. If it is determined that the read data does not indicate that the replay combination was won, the process shifts to Step S107.

Next, an automatic insertion of game medals as demanded is executed (Step S106). In this process, the main CPU 102 reads out the data indicating the previous insertion number from the main RAM 106, and stores the BET number in the main RAM 106 and turns ON the BET lamps 18 on the basis of those data. After this process, it shifts to Step S108.

Next, it is determined whether or not game medals have been inserted (Step S107). In this process, the medal sensor 152 transmits a medal insertion signal to the main CPU 102, and the main CPU 102 thus having received the medal insertion signal stores it as the BET number in the main RAM 106. If the BET number is the maximum, the main CPU 102 stores the signal not as the BET number but as the credit number.

And, the main CPU 102 reads out the BET number from the RAM 106, and shifts the process to Step S108, if it discriminates that the BET number is counted or stored as the data other than 0. The process, however, shifts to Step S103 if it determines that the BET number is not stored as the data other than 0.

Next, it is determined whether or not the start switch has been turned ON (Step S108). In this process, the start switch 150 transmits the start signal to the main CPU 102, if the operation of the start lever 32 has been detected, and the main CPU 102 having received the start signal determines whether or not the start switch has been turned ON. The main CPU 102 receives the start signal and shifts the process to Step S109, if it determines that the start switch has been turned ON. The process, however, shifts again to Step S108, if it neither receives the start signal nor determines that the start switch has been turned ON.

Next, it determines whether or not 4.1 seconds have elapsed from the previous game start (Step S109). In this process, the main CPU 102 determines whether or not the counted value, as started from the start of the previous game, of the timer packaged in the main CPU 102 is a predetermined time period, e.g., 4.1 seconds or longer in this embodiment. The main CPU 102 shifts the process to Step S111, if it determines that the counted value of the timer is 4.1 seconds or longer. The process, however, shifts to Step S110, if it determines that the counted value of the timer is not 4.1 seconds or longer.

Next, the consumption of the game start awaiting time is executed (Step S110). In this process, the main CPU 102 consumes the game awaiting time without shifting the process to the next process till the counted value in the process of Step S109 reaches 4.1 seconds. If it determines at Step S109 that the counted value reaches 4.1 seconds, the main CPU 102 shifts the process to Step S111.

Next, the reels are turned (Step S111). In this process, the main CPU 102 transmits a drive signal to the motor drive circuit 130 for controlling the drives of the stepping motors 128L, 128C, 128R so as to drive the stepping motors 128L, 128C, 128R such that the reels 26L, 26C, 26R are rotatably driven. After the end of this process, the process shifts to Step S112.

Next, random numbers for lottery are selected (Step S112). In this process, the main CPU 102 transmits a sampling signal to the sampling circuit 114, and the sampling circuit 114 having received the sampling signal transmits data for producing the random number to the random number generator 116. And, the random number generator 116 provides the random number to the main CPU 102. The main CPU 102 has the main RAM 106 store the random number provided from the random number generator 116.

Based on the random number, stopping positions of the reels 26L, 26C and 26R, which have been rotatably driven in Step S111, are determined. In this process, the main CPU 102 selects the random number for the lottery. Specifically, the random number is selected from the range of 0 to 16383. After the end of this process, it shifts to Step S112.

Next, the random number for the lottery is selected (at Step S112). In this process, the main CPU 102 transmits a signal for generating the random number to the random number generator 116. In response to the signal provided from the main CPU 102 to generate the random number, the random number generator 116 generates the random number and provide the random number to the main CPU 102. The main CPU 102 receives the random number and has the main RAM 106 store it. After the end of this process, the process shifts to Step S113.

Next, as shown in FIG. 14, the 1-game monitoring timer is set (Step S113). In this process, the main CPU 102 sets the timer built therein. This timer includes an automatic stop timer for stopping the reels 26L, 26C and 26R automatically, not based on the stopping operation of the player. After the end of this process, the process shifts to Step S114.

Next, a gaming state is monitored (Step S114). In this process, the main CPU 102 monitors the gaming state with the slot machine 10, as will be described later. After the end of this process, it shifts to Step S115.

Next, a probability lottery is executed (Step S115). In this process, the main CPU 102 executes the process about the internal lottery based on the random number, which is stored in the main RAM 106 in Step S112. After the end of this process, it shifts to Step S116.

Next, a stop table group is selected (Step S116). The main CPU 102 selects the stop table based on the gaming state or the like, as will be described later. After the end of this process, it shifts to Step S117.

Next, the start command is transmitted (Step S117). In this process, the main CPU 102 provides pieces of information such as information on an internal winning combination, selection results of the stop table group, gaming states, kinds of stored probability lottery tables, and stock numbers, as data for starting a game, to the sub control circuit 200. After the end of this process, it shifts to Step S118.

Next, it is determined whether or not stop buttons have been turned ON (Step S118). In this process, the reel stop signal circuit 154 provides a stop signal to the main CPU 102, if the operation of each of the stop buttons 34L, 34C and 34R are detected. If the main CPU 102 receives the stop signal and determines that the stop buttons are turned ON, it shifts the process to Step S120. If the main CPU 102 does not receives the stop signal and it determines that the stop buttons are not turned ON, it shifts the process to Step S119.

Next, it is determines whether or not the value of the automatic stop timer is “0” (Step S119). In this process, the main CPU 102 makes the above determination based on the count, which is started from Step S113. The main CPU 102 shifts the process to Step S120, if it determines that the value of the automatic stop timer is “0”. However, it shifts the process to Step S118 if it determines that the value of the automatic stop timer is not “0”.

Next, the slipping frame number is determined (Step S120). In this process, the main CPU 102 determines the slipping frame number based on the stop position having detected in the operation of each of the stop buttons 34L, 34C and 34R and a stop table selected from the stop table group. The main CPU 102 have the main RAM 106 store the slipping frame number. After the end of this process, it shifts to Step S121.

Next, the reel is stopped after turning the reel for the same number of frames as the corresponding slipping frame number (at Step S121). In this process, the main CPU 102 reads out the data indicating the slipping frame number stored in the main RAM 106 in Step S120, and transmits the stop signal to the motor drive circuit 130 for controlling stops of the stepping motors 128L, 128C and 128R based on those data so that the stepping motors 128L, 128C and 128R are stopped to show the reels 26L, 26C and 26R in stopping states. After the end of this process, it shifts to Step S122.

Next, it is determined whether or not all the reels have been stopped (Step S122). In this process, the main CPU 102 determines whether all the reels are stopped or not. If it determines so, it shifts the process to Step S123. However, if it determines that all the reels have not been stopped, it shifts the process back to Step S118.

Next, as shown in FIG. 15, the stop command is transmitted (Step S123). In this process, the main CPU 102 transmits a command that all the reels are stopped to the sub control circuit 200. After the end of this process, it shifts to Step S124.

Next, a prize is retrieved (Step S124). In this process, the main CPU 102 retrieves the prize based on the stop position of each of the reels 26L, 26C and 26R, the BET number data, and the winning symbol combination table. Then, the main CPU 102 has the winning flag stored in the main RAM 106. After the end of this process, it shifts to Step S125.

Next, it is determined whether or not the winning flag is normal (Step S125). In this process, the main CPU 102 shifts the process to Step S127, if it determines that the winning flag is normal. However, it shifts the process to Step S126 if it determines that the winning flag is not normal.

Next, the illegal error is displayed (Step S126). In this process, the main CPU 102 transmits a display instruction for displaying the illegal error image to the sub control circuit 200 through the input/output bus 108. In response to this instruction, the sub-CPU 212 in the sub control circuit 200 displays the illegal error image on the display device 30 through the image control circuit 250. After the end of this process, the game is interrupted.

Next, the game medals are credited or paid out (Step S127). In this process, based on the winning flag stored in the main RAM 106 in Step S124, the main CPU 102 either updates the credit number of the game medals positioned at the main RAM, or provides a payout instruction signal to the hopper drive circuit 124 so that a predetermined number of game medals are paid out from the hopper 126. After the end of this process, it shifts to Step S128.

Next, the gaming state at the end of the game is monitored (Step S128). In this process, the main CPU 102 reads out the data indicating the gaming state, which are stored in the main RAM 106, and determines the gaming state at the next game or later based on those data. The main CPU 102 may set the various data and flags, when it determines the next and subsequent gaming states, on the basis of the result of the determination. After the end of this process, it shifts to Step S129.

Next, the end command is sent (Step S129). In this process, the main CPU 102 provides the sub control circuit 200 with a command indicating the end of one game. After the end of this process, it shifts to Step S102.

[Operation of Sub Control Circuit]

In the sub control circuit 200, as shown in FIG. 16, it is determined whether or not the demo command has been received (Step S201). In this process, the sub CPU 212 shifts the process to Step S202, if it determines that the demo command has been received through the IN port 218. However, it shifts the process to Step S203 if it determines that the demo command has not been received.

If it is determined at Step S201 that the demo command has been received, the effect variables at the demo time are stored (Step S202). In this process, the sub CPU 212 has the sub RAM 216 store a variable indicating the demo time. After the end of this process, it shifts to Step S203.

Next, it is determined whether or not the start command has been received (Step S203). In this process, the sub CPU 212 shifts the process to Step S204, if it determines that the start command has been received through the IN port 218. However, it shifts the process to Step S205 if it determines that the start command has not been received.

If it is determined that the start command has been received in Step S203, the effect variables at the starting time are stored (Step S204). In this process, the sub CPU 212 has the sub RAM 216 store the variables indicating the starting time. After the end of this process, it shifts to Step S205.

Next, it is determined whether or not the stop command has been received (Step S205). In this process, the sub CPU 212 shifts the process to Step S206, if it determines that the stop command has been received. However, it shifts the process to Step S207 if it determines that the stop command has not been received.

If it is determined that the stop command has been received in Step S205, the effect variables at the stop time are stored (Step S206). In this process, the sub CPU 212 has the sub RAM 216 store a variable indicating the stop time. After the end of this process, it shifts to Step S207.

Next, it is determined whether or not the end command has been received (Step S207). In this process, the sub CPU 212 shifts the process to Step S208, if it determines that the end command has been received through the IN port 218. However, it shifts the process to Step S209 if it determines that the end command has not been received.

If it is determined at Step S207 that the end command has been received, the effect variables at the ending time are stored (Step S208). In this process, the sub CPU 212 has the sub RAM 21 store the variables indicating the ending time. If this processing is ended, it shifts to Step S209.

Next, the display effect is controlled on effect variables (Step S209). In this process, the sub CPU 212 reads out the variables indicating the game situations such as the demo time, the start time, the stop time, or the end time, as positioned in the sub RAM 216, and makes the display effects on the basis of those variables. After the end of this process, it shifts to Step S201.

The effect controls to be executed in Step S209 will be described with reference to FIG. 17.

First of all, as shown in FIG. 17, the effect variables are referred to (Step S211). In this process, the sub CPU 212 reads out the variables indicating the game situations such as the demo time, the start time, the stop time, and the end time, as positioned in the sub RAM 216. After the end of this process, it shifts to Step S212.

Next, the image control is executed on the basis of the effect variables (Step S212). In this process, the sub CPU 212 provides the image display instruction to the image control circuit 250 through the OUT port 220 on the basis of the effect variables referred to in Step S211.

In the image control circuit 250, the image control CPU 252 receives the image display instruction, as provided from the sub-microcomputer 210, through the IN port 264, and provides the image display instruction to the image control IC on the basis of the image display instruction.

The image control IC 262 reads out the predetermined image data from the image ROM 258 on the basis of the image display instruction. The image control IC 262 has the video RAM 260 store the image data in a superposing manner. And, the image control IC 262 reads out the image data stored in the video RAM 260, and provides them to the scale circuit 400. After the end of this process, it shifts to Step S213.

Next, the sound is controlled on the basis of the effect variables (Step S213). In this process, the sub CPU 212 provides the sound effect instruction to the lamp control circuit 300 through the OUT port 220 on the basis of the effect variables referred to in Step S211.

The sound source IC 302 receives the sound effect instruction, and reads out the predetermined sound data from the sound ROM 304. The sound source IC 302 provides the sound data to the power amplifier 306 so that the sounds are emitted for the sound effects from the speakers 46. After the end of this process, it shifts to Step S214.

Next, the lamp control is executed on the basis of the effect variables (Step S214). In this process, the sub CPU 212 provides the lamp effect instruction to the lamp control circuit 300 through the OUT port 220 on the basis of the effect variables referred to in Step S211.

The lamp drive circuit 322 receives the lamp effect instruction to turn ON/OFF the effect lamps 172.

Here, in this process, the lamp effects can be made on the various lamps, but the lamp effects on the reel back lamps 63 are restricted. Usually, the reel back lamps 63 are turned ON, and they are turned OFF or another color lamp is turned ON, if the display effects are to be made. After the end of this process, the present subroutine is ended.

[Operation of Scale Circuit]

At the scale circuit 400, as shown in FIG. 18, the timer count is started (Step S301). In this process, the signal conversion CPU 272 starts the count of the timer built therein. After the end of this process, it shifts to Step S302.

Next, it is determined whether or not a predetermined period has elapsed (Step S302). In this process, the signal conversion CPU 272 shifts the process to Step S303, if it determines that the count of the timer built therein has elapsed for more than the predetermined period. However, it shifts back the process to Step S302 if it determines that the count of the timer has not elapsed for more than the predetermined period.

If it is determined in Step S302 that the predetermined period has elapsed, it is determined whether or not the image signal or the synchronized signal has been received (Step S303). In this process, the signal conversion CPU 272 shifts the process to Step S304, if it determines that the image signal has been received through the IN port 278. However, it shifts the process to Step S306 if it determines that the image signal has not been received.

If it is determined in Step S303 that the image signal has been received, the received image is enlarged (Step S304). In this process, the signal conversion CPU 272 enlarges and converts the received image signal into the enlarged and converted image signals. After the end of this process, it shifts to Step S305.

Next, the enlarged image is stored (Step S305). In this process, the signal conversion CPU 272 has the video RAM 276 store the image data enlarged and converted in Step S304. After the end of this process, it shifts to Step S307.

If it is determined in Step S303 that the image signal has not been received, an image of high transparency is stored (Step S306). In this process, the signal conversion CPU 272 has the video RAM 276 store the image of relatively high transparency. After the end of this process, it shifts to Step S307.

Next, the image signal is transmitted (Step S307). In this process, the signal conversion CPU 272 reads out the image data stored in the video RAM 276 and provides the image data through the OUT port 280 to the display device 30.

If the signal conversion CPU 272 provides the image signal, it provides an effective signal to the liquid crystal back lights 292 so that the liquid crystal back lights 292 illuminates.

The liquid crystal drive circuit 291 having received the image data converts the image data, and displays the image on the liquid crystal display device 54 based on the image data.

The liquid crystal back lights 292 receive the aforementioned effective signal and illuminate the liquid crystal display device 54 from the back. After the end of this process, it shifts to Step S301.

Thus, there are provided the display device having the display control means, and the image state control unit including the image state control means for receiving the image signals provided from the display control means and for controlling the display device in a predetermined state if the image signals are abnormal. The uncomfortable image, as might otherwise be caused by various troubles, can be kept from being displayed on the display device, and the display device may be kept in the predetermined state. By eliminating one factor which may give an uncomfortable feel during playing the game, the interest of the player can be maintained for a long time.

By displaying the disturbed image caused due to the failures in the display device, the display control means, the power supply feed, and so on, for example, the game could make the player feel uncomfortable. By eliminating one of the causes for such an uncomfortable feeling, it may be possible to provide the game capable of maintaining the interest of the player for a long time.

The image state control unit is provided with the image state control means and the image enlarging conversion means for converting the image signal received from the display control means into the enlarged image signal. Therefore, the uncomfortable image, as might otherwise be caused by various troubles, can be kept in the predetermined state without being displayed in the display device. By eliminating one of the factors which may give an uncomfortable feel during playing the game, it is possible to provide a game capable of maintaining the interest of the player for a long time.

After the image signal is enlarged and converted, the image signal is displayed in a larger image than usual on the display device. The enlarged display can provide a game having a dynamic effect, but may give more uncomfortable image influence to the player as the image becomes larger. Especially if the image thus enlarged and converted is displayed, it may give a relatively serious uncomfortable feeling to the player. By eliminating one of the causes for the causing uncomfortable feeling during the play, it is possible to provide the game, which can maintain the interest of the player for longer time.

By providing the image state control means and the image enlarging conversion means in an image state control unit commonly, it is possible to avoid the size enlargement as well as to save space. The unit may be less subject to the influence of noise.

The gaming machine may be provided with a rotatable reel having a plurality of symbols drawn on an outer periphery thereof, and a display device disposed in front of the reel wherein the display device may include transparent image display means for displaying the images of relatively high transparency. Therefore, in the gaming machine having the display device disposed in front of the reel, which the player tends to pay the most attention to, it is possible to provide a game being accompanied with dynamic display effects. On the more noticeable place an image is displayed, the more likely it is to give a seriously uncomfortable feeling to the player. Especially if the display device is thus disposed in front of the reel, rather serious uncomfortable feeling can be given to the player. By eliminating one of the causes for giving the uncomfortable feeling during the play, it is possible to provide a game which can maintain the interest of the player for longer time.

Here, in this embodiment, the display device 30 is disposed in front of the reels 26L, 26C and 26R, and the display device 30 is configured that relatively transparent images can be displayed on the display device 30. However, the present invention should not be limited thereto. The display device 30 may not be disposed in front of the reels 26L, 26C and 26R. Moreover, the display device 30 may not have the function to display relatively transparent images. In such a case, the gaming machine is configured so that the display device can be controlled to be kept the screen in a state by displaying a predetermined image when anything abnormal is detected.

Moreover, the achievements or effects are some of the most proper achievements or effects obtained according to the embodiment of the present invention. The achievements or effects of the present invention should not be limited thereto.

According to the present invention, there are provided a display device having the display control means, and an image state control unit including image state control means for receiving an image signal provided from display control means to display an image on the display device and for controlling the display device into a certain state if the image signal is abnormal or not normal. Therefore, an uncomfortable image, as might otherwise be caused by various troubles, can be kept in the predetermined state without being displayed on the display device. By eliminating one of the factors which may give an uncomfortable feel during the play of the game, it is possible to provide a game capable of maintaining the interest of the player for a long time.

Here, in the foregoing embodiment, the sub-control board or the sub control circuit is provided with the scale circuit as one of the examples of the image state control unit. However, the scale circuit may be included in the main control board. Alternatively, the function of the sub-control board may also be included in that of the main control board.

What is claimed is:

1. A gaming machine comprising:

a variable display device that displays a plurality of reels each bearing symbols associated with an outcome of a wagering game;

a transmissive display device that displays an image relating to a game, the transmissive display device including a liquid crystal display device configured to transition between a transmissive state and a non-transmissive state, at least a portion of each of the reels being visible through the liquid crystal display device when in the transmissive state, and the portion of each of the reels being visibly obstructed by the liquid crystal display device when in the non-transmissive state;

a memory device that stores a plurality of images in a form of a plurality of image signals, at least one of the plurality of images being a predetermined image; and an image state control unit that controls the image to be displayed, wherein the image state control unit receives and monitors the plurality of image signals and determines whether synchronizing signals carried with the received plurality of image signals fall in a predetermined specification and, if the image state control unit determines that the received synchronizing signals fall in the predetermined specification, the image state control unit causes respective ones of the plurality of images associated with the received plurality of image signals to be displayed on the transmissive display device and, if the image state control unit determines that the received synchronizing signals do not fall in the predetermined specification, the image state control unit causes the predetermined image to be displayed on at least a first portion of the liquid crystal display device and causes at least a second portion of the liquid crystal display device, the at least a second portion being distinct from the at least a first portion, to transition to the transmissive state such that the portion of each of the reels is visible through the liquid crystal display device and the outcome of the wagering game can be viewed by the player.

2. The gaming machine according to claim 1, wherein the image state control unit converts the image signal and provides the image signal as an enlarged image signal to the transmissive display device to provide a game having a dynamic effect.

3. The gaming machine according to claim 1, wherein each of the reels includes a rotatable reel with a plurality of symbols on an outer periphery thereof, the reels being disposed behind the transmissive display device such that at least a part of the symbols is visible through the display device when the display device is controlled to show the predetermined image.

4. The gaming machine according to claim 3, further comprising:

a light that illuminates at least a part of the symbols when the liquid crystal display device is controlled to display the predetermined image.

5. The gaming machine according to claim 3, wherein the liquid crystal display device shows the image such that at least a part of the plurality of symbols is visible so that no abnormal image is displayed when the display device does not function normally or malfunctions.

6. The gaming machine according to claim 1, wherein at least a part of the liquid crystal display device is substantially light transparent so that no abnormal image is displayed when the display device does not function normally or malfunctions.

7. The gaming machine according to claim 1, wherein the image state control unit is positioned above the transmissive display device so that the image state control unit is less influenced by static electricity caused by contact with a player.

8. A display assembly for a gaming machine having a variable display device that displays reels bearing symbols associated with an outcome of a wagering game, the display assembly comprising:

a transmissive display device that displays an image corresponding to a provided image signal, the display device including a liquid crystal display device configured to transition between a transmissive state and a non-transmissive state, at least a portion of each of the reels being visible through the liquid crystal display device when in the transmissive state, and the portion of each of the reels being visibly obstructed by the liquid crystal display device when in the non-transmissive state;

a memory device that stores a plurality of images in a form of a plurality of image signals, one of the plurality of images being a predetermined image; and an image state control unit that controls the image to be displayed on the display device, wherein the image state control unit receives and monitors the plurality of image signals and determines whether synchronizing signals carried with the received plurality of image signals fall in a predetermined specification and, if the image state control unit determines that the received synchronizing signals fall in the predetermined specification, the image state control unit causes respective ones of the plurality of images associated with the received plurality of image signals to be displayed on the transmissive display device and, if the image state control unit determines that the received synchronizing signals do not fall in the predetermined specification, the image state control unit causes the predetermined image to be displayed on at least a first portion of the liquid crystal display device and causes at least a second portion of the liquid crystal display device, the at least a second portion being distinct from the at least a first portion, to transition to the transmissive state such that the portion of each of the reels is visible through the liquid crystal display device and the outcome of the wagering game can be viewed by the player.

9. A method of operating a wagering game machine with a variable display device that displays reels each bearing symbols associated with an outcome of a wagering game, and a transmissive display device with a liquid crystal display device configured to transition between a transmissive state and a non-transmissive state, at least a portion of each of the reels being visible through the liquid crystal display device when in the transmissive state, and the portion of each of the reels being visibly obstructed by the liquid crystal display device when in the non-transmissive state, the method comprising:

displaying via the display device an image associated with a wagering game;

storing via a memory device a plurality of images in a form of a plurality of image signals, at least one of the plurality of images being a predetermined image;

monitoring via an image state control device the plurality of image signals;

determining via the image state control device whether synchronizing signals carried with the plurality of image signals fall within a predetermined specification;

responsive to the image state control device determining that the synchronizing signals fall within the predetermined specification, displaying respective ones of the plurality of images associated with the monitored image signals on the transmissive display device; and responsive to the image state control device determining that the synchronizing signals do not fall within the predetermined specification, displaying the predetermined image on at least a first portion of the liquid crystal display device and transitioning at least a second portion of the liquid crystal display device, the at least a second portion being distinct from the at least a first portion, to the transmissive state such that the portion of each of the reels is visible through the liquid crystal display device and the outcome of the wagering game can be viewed by the player.

10. The method of claim 9, further comprising:

converting at least one of the image signals to an enlarged image signal; and transmitting the enlarged image signal to the transmissive display device such that the transmissive display device displays an enlarged image associated with the enlarged image signal.

11. The method of claim 9, wherein the variable display device is located behind the display device, the method further comprising displaying via the variable display device a plurality of symbols associated with an outcome of the wagering game.

12. The method of claim 11, wherein, responsive to determining that the synchronizing signals fall within the predetermined specification, displaying the images associated with the plurality of image signals via the transmissive liquid crystal display device such that at least a portion of the variable display device is visually obstructed from a player.

13. A gaming system comprising:

an input device configured to receive an input from a player;

a variable display device configured to display a plurality of reels each bearing symbols associated with outcomes of a wagering game;

a front display device adjacent the variable display device, the front display device including a liquid crystal panel operable to transition between a transmissive state and a non-transmissive state, wherein at least a portion of each reel in the plurality of reels is visible through the liquid crystal panel when in the transmissive state, and wherein the portion of the plurality of reels is visibly obstructed by the liquid crystal panel when in the non-transmissive state;

a memory device storing a plurality of images as a plurality of image signals, and storing a plurality of predetermined images; and a control unit operatively connected to the memory device and the front display device, the control unit being configured to:

receive from the memory device the plurality of image signals;

determine whether synchronizing signals associated with the received plurality of image signals fall within a predetermined specification;

in response to the synchronizing signals falling within the predetermined specification, cause the front display device to display the plurality of images associated with the received plurality of image signals; and in response to the synchronizing signals not falling within the predetermined specification, cause a first portion of the liquid crystal panel to display at least one of the plurality of predetermined images and a second portion of the liquid crystal panel, the second portion being distinct from the first portion, to transition to the transmissive state such that the portion of each of the reels in the plurality of reels is visible through the liquid crystal panel and the outcomes of the wagering game can be viewed by the player.

14. The gaming system of claim 13, wherein the control unit is further configured to, in response to the synchronizing signals not falling within the predetermined specification, cause the liquid crystal panel to display a predetermined image unrelated to the received plurality of image signals.

15. The gaming system of claim 13, wherein the control unit is further configured to, in response to the synchronizing signals not falling within the predetermined specification, cause the liquid crystal panel to display a predetermined image related to the received plurality of image signals.

16. The gaming system of claim 13, wherein the control unit is further configured to, in response to the synchronizing signals not falling within the predetermined specification, cause the liquid crystal panel to display a predetermined image, the predetermined image being a still picture or a moving picture, or a combination thereof.

17. The gaming system of claim 13, wherein the control unit is further configured to, in response to the synchronizing signals not falling within the predetermined specification, convert the received plurality of image signals into enlarged image signals and cause the liquid crystal panel to display enlarged images associated with the enlarged image signals.

18. The gaming system of claim 13, wherein the control unit is further configured to, in response to the synchronizing signals falling within the predetermined specification, cause the liquid crystal panel to transition to the non-transmissive state.

19. The gaming system of claim 18, wherein the liquid crystal panel, when in the non-transmissive state, displays one or more images in front of the plurality of reels.

20. The gaming system of claim 18, wherein the liquid crystal panel, when in the non-transmissive state, conceals the plurality of reels from the player.

21. The gaming system of claim 13, wherein the synchronizing signals not falling within the predetermined specification includes the plurality of images associated with the received plurality of image signals being abnormal.

22. The gaming system of claim 13, wherein the synchronizing signals not falling within the predetermined specification includes power provided by a power source to the display device being abnormal.

23. A gaming system comprising:

a variable display device configured to display a plurality of symbol-bearing reels associated with outcomes of a wagering game;

a transmissive display device configured to display images associated with the wagering game, the transmissive display device including a liquid crystal panel through which at least a portion of each reel in the plurality of symbol-bearing reels is visible when the liquid crystal panel is in a transmissive state, the liquid crystal panel being operable to transition from the transmissive state to a non-transmissive state so as to visually obstruct the portion of each reel in the plurality of symbol-bearing reels;

a memory device configured to store a plurality of images as a plurality of image signals, and storing a plurality of predetermined images; and an image state control unit configured to monitor the plurality of image signals and determine whether synchronizing signals associated with the monitored plurality of image signals fall within a predetermined specification, the image state control unit being further configured to, responsive to the synchronizing signals falling within the predetermined specification, cause the transmissive display device to display the plurality of images associated with the monitored plurality of image signals, and, responsive to the synchronizing signals not falling within the predetermined specification, cause a first portion of the liquid crystal panel to display at least one of the plurality of predetermined images and a second portion, the second portion being distinct from the first portion, to transition to the transmissive state such that the portion of each of the reels in the plurality of symbol-bearing reels and an outcome of the wagering game is visible through the liquid crystal panel.

* * * * *

UNITED STATES PATENT AND TRADEMARK OFFICE

CERTIFICATE OF CORRECTION

PATENT NO. : 7,972,206 B2
APPLICATION NO. : 10/715598
DATED : July 5, 2011
INVENTOR(S) : Kazuo Okada It is certified that error appears in the above-identified patent and that said Letters Patent is hereby corrected as shown below:

On the Title Page:

Item (73) Assignee:

Please delete “WMS Gaming Inc., Waukegan, IL (US)” and

Please insert -- Universal Entertainment Corporation, Tokyo (JP) --

Signed and Sealed this
Eighteenth Day of October, 2011

David J. Kappos
*Director of the United States Patent and Trademark Office*